United States Patent
Havemose

(10) Patent No.: US 8,621,275 B1
(45) Date of Patent: Dec. 31, 2013

(54) SYSTEM AND METHOD FOR EVENT-DRIVEN LIVE MIGRATION OF MULTI-PROCESS APPLICATIONS

(75) Inventor: Allan Havemose, Arroyo Grande, CA (US)

(73) Assignee: Open Invention Network, LLC, Durham, NC (US)

(*) Notice: Subject to any disclaimer, the term of this patent is extended or adjusted under 35 U.S.C. 154(b) by 507 days.

(21) Appl. No.: 12/957,593

(22) Filed: Dec. 1, 2010

Related U.S. Application Data

(63) Continuation-in-part of application No. 12/887,144, filed on Sep. 21, 2010, which is a continuation-in-part of application No. 12/851,706, filed on Aug. 6, 2010.

(51) Int. Cl.
*G06F 11/00* (2006.01)

(52) U.S. Cl.
USPC .......................................................... 714/13

(58) Field of Classification Search
USPC .......................................................... 714/13
See application file for complete search history.

(56) References Cited

U.S. PATENT DOCUMENTS

| | | | |
|---|---|---|---|
| 5,621,885 A | 4/1997 | Del Vigna, Jr. | |
| 5,754,752 A | 5/1998 | Sheh et al. | |
| 5,951,695 A | 9/1999 | Kolovson | |
| 6,035,415 A | 3/2000 | Fleming | |
| 6,266,781 B1 | 7/2001 | Chung et al. | |
| 6,266,785 B1 | 7/2001 | McDowell | |
| 6,317,844 B1 | 11/2001 | Kleiman | |
| 6,580,898 B1 | 6/2003 | Oguri | |
| 6,622,261 B1 | 9/2003 | Laranjeira et al. | |
| 6,625,751 B1 | 9/2003 | Starovic et al. | |
| 6,687,849 B1 | 2/2004 | Cherf | |
| 6,928,577 B2 | 8/2005 | Moser et al. | |
| 7,076,687 B2 * | 7/2006 | Fujibayashi et al. | 714/6.31 |
| 7,206,964 B2 * | 4/2007 | Moser et al. | 714/13 |
| 7,228,452 B2 | 6/2007 | Moser et al. | |
| 7,305,582 B1 * | 12/2007 | Moser et al. | 714/13 |
| 7,321,906 B2 | 1/2008 | Green | |
| 7,363,534 B1 | 4/2008 | Krishnamurthy et al. | |
| 7,418,462 B2 | 8/2008 | Lomet et al. | |
| 7,478,273 B2 | 1/2009 | Nakamura et al. | |
| 7,620,710 B2 | 11/2009 | Kottomtharayil et al. | |
| 7,725,763 B2 | 5/2010 | Vertes et al. | |
| 7,873,805 B2 | 1/2011 | Obernuefemann | |
| 7,890,469 B1 | 2/2011 | Maionchi et al. | |
| 7,983,190 B2 | 7/2011 | Hirota | |
| 8,010,495 B1 | 8/2011 | Kuznetzov et al. | |
| 8,051,324 B1 | 11/2011 | Zhao et al. | |
| 8,301,700 B1 * | 10/2012 | Havemose | 709/205 |
| 8,417,885 B2 * | 4/2013 | Chou et al. | 711/112 |
| 2002/0133738 A1 | 9/2002 | Zeigler et al. | |
| 2004/0034808 A1 | 2/2004 | Day, III et al. | |
| 2004/0078618 A1 | 4/2004 | Moser et al. | |
| 2004/0078625 A1 | 4/2004 | Rampuria et al. | |
| 2004/0103342 A1 | 5/2004 | Moser et al. | |

(Continued)

*Primary Examiner* — Yair Leibovich
(74) *Attorney, Agent, or Firm* — Haynes and Boone, LLP

(57) ABSTRACT

A system, method, and computer readable medium for asynchronous live migration of applications between two or more servers. The computer readable medium includes computer-executable instructions for execution by a processing system. Primary applications runs on primary hosts and one or more replicated instances of each primary application run on one or more backup hosts. Asynchronous live migration is provided through a combination of process replication, logging, barrier synchronization, checkpointing, reliable messaging and message playback. The live migration is transparent to the application and requires no modification to the application, operating system, networking stack or libraries.

19 Claims, 23 Drawing Sheets

(56) References Cited

U.S. PATENT DOCUMENTS

| | | |
|---|---|---|
| 2005/0066056 A1 | 3/2005 | Dominic |
| 2005/0144519 A1* | 6/2005 | Hill et al. .................. 714/13 |
| 2005/0157741 A1 | 7/2005 | Wu et al. |
| 2005/0165861 A1 | 7/2005 | Christie et al. |
| 2005/0251785 A1 | 11/2005 | Vertes et al. |
| 2006/0053263 A1 | 3/2006 | Prahlad et al. |
| 2006/0209895 A1 | 9/2006 | Hirota |
| 2006/0262734 A1* | 11/2006 | Appanna et al. .............. 370/254 |
| 2007/0143497 A1 | 6/2007 | Kottomtharayil et al. |
| 2007/0234342 A1* | 10/2007 | Flynn et al. ................... 717/174 |
| 2007/0244937 A1* | 10/2007 | Flynn et al. ................... 707/204 |
| 2008/0005509 A1 | 1/2008 | Smith et al. |
| 2008/0077686 A1* | 3/2008 | Subhraveti .................... 709/224 |
| 2008/0104443 A1 | 5/2008 | Akutsu et al. |
| 2008/0133646 A1 | 6/2008 | Azulai |
| 2009/0103342 A1 | 4/2009 | Lin |
| 2009/0177915 A1 | 7/2009 | Dominic |
| 2010/0030818 A1 | 2/2010 | Cooper et al. |
| 2010/0161550 A1 | 6/2010 | Jiang et al. |
| 2010/0274984 A1 | 10/2010 | Inomata et al. |
| 2010/0325485 A1 | 12/2010 | Kamath et al. |
| 2011/0167196 A1 | 7/2011 | Scales et al. |
| 2011/0167298 A1 | 7/2011 | Lee |
| 2011/0276620 A1 | 11/2011 | Pirzada et al. |

* cited by examiner

FIG.1 – Primary and Backup Architecture

FIG. 2 – Primary and Backup Pair

FIG. 3 – Interception

FIG. 4 — Creation Replication Messages by Primary

FIG. 5 — Primary's Messaging Engine

FIG.6 – Backup's Messaging Engine

FIG. 7 — Handling PROCESS messages

FIG. 8 – Backup's Processing of replication messages

FIG. 9 — I/O write processing

FIG. 10 – Deployment scenarios

FIG. 11 – Sending one message

FIG. 12 – Multiple message with Retransmit

FIG.13 – Message Processing Unit

FIG. 14 – Multiple backups

FIG. 15 Non-blocking primary execution

FIG. 16 – Reliable messaging over TCP

FIG. 17 – Primary and Backup

FIG. 21 – PAQ Logging

SYSTEM AND METHOD FOR EVENT-DRIVEN LIVE MIGRATION OF MULTI-PROCESS APPLICATIONS

CROSS-REFERENCE TO RELATED APPLICATIONS

This application is a continuation in part and claims priority from U.S. application Ser. No. 12/887,144 filed Sep. 21, 2010 titled SYSTEM AND METHOD FOR TRANSPARENT CONSISTENT APPLICATION-REPLICATION OF MULTI-PROCESS MULTI-THREADED APPLICATIONS, which is a continuation in part and claims priority from U.S. patent application Ser. No. 12/851,706 filed Aug. 6, 2010 titled SYSTEM AND METHOD FOR TRANSPARENT CONSISTENT APPLICATION-REPLICATION OF MULTI-PROCESS MULTI-THREADED APPLICATIONS, is related to U.S. patent application Ser. No. 12/887,598 filed Sep. 22, 2010 titled SYSTEM AND METHOD FOR RELIABLE NON-BLOCKING MESSAGING FOR MULTI-PROCESS APPLICATION REPLICATION, and is related to U.S. patent application Ser. No. 12/887,651 filed Sep. 22, 2010 titled SYSTEM AND METHOD FOR RELIABLE NON-BLOCKING MESSAGING FOR MULTI-PROCESS APPLICATION REPLICATION, the disclosure of each of which are incorporated herein by reference in their entirety.

This application is furthermore related to U.S. patent application Ser. No. 11/213,678 filed Aug. 25, 2005 titled METHOD AND SYSTEM FOR PROVIDING HIGH AVAILABILITY TO COMPUTER APPLICATIONS, and is related to U.S. patent application Ser. No. 12/334,660 filed Dec. 15, 2008 METHOD AND SYSTEM FOR PROVIDING CHECKPOINTING TO WINDOWS APPLICATION GROUPS, and is related to U.S. patent application Ser. No. 12/334,651 filed on Dec. 15, 2008 titled METHOD AND SYSTEM FOR PROVIDING STORAGE CHECKPOINTING TO A GROUP OF INDEPENDENT COMPUTER APPLICATIONS, the disclosures of each of which are incorporated herein by reference in their entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains to software-based fault tolerant computer systems, computer networks, telecommunications systems, embedded computer systems, wireless devices such as cell phones and PDAs, and more particularly to methods, systems and procedures (i.e., programming) for live migration of applications both in response to an external event and in response to a system fault. Generally live migration is triggered by an event which allows for orderly live application migration between two operational systems. The present inventions furthermore provides live migration as an element of fault recovery, i.e. live migration is used to let an application continue execution on a backup server in event that the primary server crashes.

2. Description of Related Art

In many environments one of the most important features is to ensure that a running application continues to run even in the event of one or more system or software faults. Mission critical systems in telecommunications, military, financial and embedded applications must continue to provide their service even in the event of hardware or software faults. The auto-pilot on an airplane is designed to continue to operate even if some of the computer and instrumentation is damaged; the 911 emergency phone system is designed to operate even if the main phone system if severely damaged, and stock exchanges deploy software that keep the exchange running even if some of the routers and servers go down. Today, the same expectations of "fault-free" operations are being placed on commodity computer systems and standard applications.

Fault tolerant systems are based on the use of redundancy (replication) to mask faults. For hardware fault tolerance, servers, networking or subsystems are replicated. For application fault tolerance, the applications are replicated. Faults on the primary system or application are masked by having the backup system or application (the replica) take over and continue to provide the service. The take-over after a fault at the primary system is delicate and often very system or application specific.

Several approaches have been developed addressing the fundamental problem of providing fault tolerance. Tandem Computers (http://en.wikipedia.org/wiki/Tandem_computer) is an example of a computer system with custom hardware, custom operating system and custom applications, offering transaction-level fault tolerance. In this closed environment, with custom applications, operating system and hardware, a fault on the primary system can be masked down to the transaction boundary and the backup system and application take over seamlessly. The fault-detection and failover is performed in real-time.

In many telecommunication systems fault tolerance is built in. Redundant line cards are provided within the switch chassis, and if one line card goes down, the switching fabric automatically re-routes traffic and live connections to a backup line card. As with the Tandem systems, many telecommunications systems are essentially closed systems with custom hardware, custom operating systems and custom applications. The fault detection and failover is performed in real-time.

In enterprise software systems the general approach taken is the combined use of databases and high availability. By custom programming the applications with hooks for high-availability it is generally possible to detect and recovery from many, but not all, types of faults. In enterprise systems, it is typically considered "good enough" to recover the application's transactional state, and there are often no hard requirements that the recovery be performed in real-time. In general, rebuilding the transactional state for an application server can take as much as 30 minutes or longer. During this time, the application services, an e-commerce website for instance, is unavailable and cannot service customers. The very slow fault recovery can to some extent be alleviated by extensive use of clustering and highly customized applications, as evidenced by Amazon.com and ebay.com, but that is generally not a viable choice for most deployments.

In U.S. Pat. No. 7,228,452 Moser et al teach "transparent consistent semi-active and passive replication of multi-threaded application programs". Moser et al disclose a technique to replicate running applications across two or more servers. The teachings are limited to single process applications and only address replica consistency as it related to mutex operations and multi-threading. Moser's invention does not require any modification to the applications and work on commodity operating systems and hardware. Moser is incorporated herein in its entirety by reference.

The present invention builds on the teachings in U.S. patent application Ser. No. 12/877,144 titled SYSTEM AND METHOD FOR TRANSPARENT CONSISTENT APPLICATION-REPLICATION OF MULTI-PROCESS MULTI-THREADED APPLICATIONS, U.S. patent application Ser. No. 12/851,706 filed Aug. 6, 2010 titled SYSTEM AND METHOD FOR TRANSPARENT CONSISTENT APPLICATION-REPLICATION OF MULTI-PROCESS MULTI-THREADED APPLICATIONS, U.S. patent application Ser. No. 12/877,598 titled SYSTEM AND METHOD FOR RELIABLE NON-BLOCKING MESSAGING FOR MULTI-PROCESS APPLICATION REPLICATION, and U.S. patent application Ser. No. 12/877,651 titled SYSTEM AND METHOD FOR RELIABLE NON-BLOCKING MESSAGING FOR MULTI-PROCESS APPLICATION REPLICATION, wherein systems and methods for application replication and non-blocking messaging are disclosed.

The present invention also builds on the teachings of U.S. patent application Ser. No. 11/213,678 filed Aug. 25, 2005 titled METHOD AND SYSTEM FOR PROVIDING HIGH AVAILABILITY TO COMPUTER APPLICATIONS, U.S. patent application Ser. No. 12/334,660 filed Dec. 15, 2008 METHOD AND SYSTEM FOR PROVIDING CHECKPOINTING TO WINDOWS APPLICATION GROUPS, and U.S. patent application Ser. No. 12/334,651 filed on Dec. 15, 2008 titled METHOD AND SYSTEM FOR PROVIDING STORAGE CHECKPOINTING TO A GROUP OF INDEPENDENT COMPUTER APPLICATIONS, wherein systems and systems for checkpointing of Windows and Linux applications and fault detection are disclosed.

Replication relies on communicating information between servers. The communication often relies on one of the core networking protocols, such as UDP or TCP. UDP, for instance, transmits messages without implicit handshaking and thus does not guarantee delivery, ordering or data integrity. TCP uses a more rigorous protocol to ensure some level of reliable, ordered delivery of messages, In the event of faults, such as a network or server faults; TCP cannot guarantee delivery, ordering or integrity. The present invention provides a reliable messaging protocol built on either TCP or UDP which ensures ordered, reliable delivery of messages.

Live migration is a technique generally used to move a running application or virtual machine from a primary server to a backup server in response to an operator command or a programmatic event. Live Migration thus happens in response to an external event which allows for a deterministic migration process. The primary and backup server must stay operational during the live migration.

Conversely, if the primary crashes there is no ability to migrate the application or virtual machine to the backup, as the primary no longer is operational. So even though the primary application or VM could have migrated at an earlier time, now that the primary server is gone, the ability to migrate it is gone, too.

Therefore, a need exists for systems and methods for providing live migration of applications and virtual machines in response to both external events and faults. The Live Migration must ensure non-stop operation of the application and transparently switch from the primary to the backup. In the event of a fault, the fault recovery must furthermore continue to service clients even though clients were disconnected from the primary at the time of the fault. Finally the live migration must work on commodity operating system, such as Windows and Linux, and commodity hardware with standard applications.

BRIEF SUMMARY OF THE INVENTION

The present invention provides systems and methods for application-replication that is consistent, transparent and works on commodity operating system and hardware. The terms "Application-replication" or "replication" are used herein to describe the mechanism by which two copies of an application are kept running in virtual lock step. The application-replication in the present invention uses a leader-follower (primary-backup) strategy, where the primary application runs on the primary server and the backup application (also called the "replica") runs on a backup server. While it's possible to run the primary application and the backup application on the same physical server, the primary and backup are generally depicted as separate servers.

The primary application runs at full speed without waiting for the backup, and a messaging system, a key component of the present invention, keeps the backup application in virtual lock step with the primary.

A replication strategy is said to achieve "replica consistency" or be "consistent" if the strategy guarantees that the primary and backup application produce the same results in the same order. Replica consistency is critical with multi-process applications where the various parts of the application execute independently of each other. Replica consistency is a key element of the present invention and is explained in further detail below.

The term "virtual lock-step" is used to describe that the application and the application's replica produce the same results in the same order, but not necessarily at the same time; the backup may be behind.

The terms "primary" and "primary application" are used interchangeably to designate the primary application running on the primary host. The host on which the primary application is running is referred to as the "primary server", "primary host" or simply the "host" when the context is clear. The term "on the primary" is used to designate an operation or activity related to the primary application on the primary server.

Similarly, the terms "backup" and "backup application" are used interchangeably to designate a backup application running on a backup host. The host on which the backup application is running is referred to as a "backup server", a "backup host" or simply a "host" when the context is clear. The terms "on the backup" or "on a backup" are used interchangeably to designate an operation or activity related to a backup application on a backup server.

The term "Live Migration" is used to designate the processes of moving a running application or a running virtual machine from a primary server to a backup server. The "migration" is "live" as the application is kept running for the majority of the move. Generally, live migration of both applications and virtual machines are planned; i.e. they are triggered in response to an event. The event may be an operator choosing to migrate the application/VM or a memory threshold being met, or other pre-defined scriptable event. For the live migration to succeed both the primary and the backup must operate during the entire live migration process.

The term "fault" is used to designate an abnormal condition or defect of a component, software, sub-system or equipment. Examples of faults include a power supply burning out, a CPU crashing, and a software bug that crashes an application. Faults can happen at any time and are thus non-deterministic, i.e. unpredictable. The term "Fault Detection" is used to designate the mechanism used to detect that a fault has occurred. In U.S. patent application Ser. No. 11/213,678 Ngan et al teach fault detection for a variety of conditions including node faults, process faults, unplanned exit faults (crashes), application hung faults, network faults, and others. Ngan is included herein in its entirety by reference.

The following terms are used throughout the disclosures:

The terms "Windows" and "Microsoft Windows" is utilized herein interchangeably to designate any and all versions of the Microsoft Windows operating systems. By example, and not limitation, this includes Windows XP, Windows Server 2003, Windows NT, Windows Vista, Windows Server 2008, Windows 7, Windows Mobile, and Windows Embedded.

The terms "Linux" and "UNIX" is utilized herein to designate any and all variants of Linux and UNIX. By example, and not limitation, this includes RedHat Linux, Suse Linux, Ubuntu Linux, HPUX (HP UNIX), and Solaris (Sun UNIX).

The term "node" and "host" are utilized herein interchangeably to designate one or more processors running a single instance of an operating system. A virtual machine, such as VMWare, KVM, or XEN VM instance, is also considered a "node". Using VM technology, it is possible to have multiple nodes on one physical server.

The terms "application" is utilized to designate a grouping of one or more processes, where each process can consist of one or more threads. Operating systems generally launch an application by creating the application's initial process and letting that initial process run/execute. In the following teachings we often identify the application at launch time with that initial process.

The term "application group" is utilized to designate a grouping of one or more applications.

In the following we use commonly known terms including but not limited to "client", "server", "API", "java", "process", "process ID (P/D)", "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "http", "ftp", "Inter-process communication (IPC), "Asynchronous Procedure Calls (APC)", "POSIX", "certificate", "certificate authority", "Secure Socket Layer", "SSL", MD-5", "MD-6", "Message Digest", "SHA", "Secure Hash Algorithm", "NSA", "NIST", "private key", "public key", "key pair", and "hash collision", and "signal". These terms are well known in the art and thus will not be described in detail herein.

The term "transport" is utilized to designate the connection, mechanism and/or protocols used for communicating across the distributed application. Examples of transport include TCP/IP, UDP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term TCP is used herein to describe the Transmission Control Protocol as found in the core suite of internet protocols. TCP provides reliable, ordered delivery of a stream of bytes, provided the network is operational and fault-free during transmission The term UDP is herein used to describe the User Datagram Protocol as found in the core suite of internet protocols. UDP is a simple protocol without implicit handshaking to guarantee data integrity or reliable, ordered delivery of data. UDP may thus delivery messages out of order, in duplicate or not at all.

The terms Two Phase Commit and 2PC are used interchangeably to designate the blocking distributed atomic transaction algorithms commonly used in databases. Likewise, the terms Three Phase Commit and 3PC are used interchangeably to designate the non-blocking distributed transaction algorithm used in some database systems. Both 2PC and 3PC are well known in the art and thus will not be described in detail herein.

The term "interception" is used to designate the mechanism by which an application re-directs a system call or library call to a new implementation. On Linux and other UNIX variants interception is generally achieved by a combination of LD_PRELOAD, wrapper functions, identically named functions resolved earlier in the load process, and changes to the kernel sys_call_table. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document we use the term interception to designate the functionality across all operating systems.

The term "transparent" is used herein to designate that no modification to the application is required. In other words, the present invention works directly on the application binary without needing any application customization, source code modifications, recompilation, re-linking, special installation, custom agents, or other extensions.

The terms "checkpointer", "checkpointing" and "checkpointing service" are utilized herein interchangeably to designate a set of services which 1) capture the entire state of an application and store all or some of the application state locally or remotely, and 2) restore the entire state of the application from said stored application checkpoint. The terms "checkpoint file" or "checkpoint" are utilized herein interchangeably to designate the data captured by the checkpointing service. Generally, the checkpoint files are written to local disk, remote disk or memory. In U.S. patent application Ser. No. 12/334,651 Havemose et al. teach "METHOD AND SYSTEM FOR PROVIDING STORAGE CHECKPOINTING TO A GROUP OF INDEPENDENT COMPUTER APPLICATIONS". In 12/334,660 Backensto et al. teach "METHOD AND SYSTEM FOR PROVIDING CHECKPOINTING TO WINDOWS APPLICATION GROUPS". Backensto and Havemose teach checkpointing on the Linux and Windows operating systems, including application associated storage. Havemose and Backensto are included in their entirety by reference The terms "barrier" and "barrier synchronization" are used herein to designate a type of synchronization method. A barrier for a group of processes and threads is a point in the execution where all threads and processes must stop before being allowed to proceed. Barriers are typically implemented using semaphores, mutexes, locks, event objects, or other equivalent system functionality. Barriers are well known in the art and will not be described further here.

To avoid simultaneous use of shared resources in multi-threaded multi-process applications locking is used. Several techniques and software constructs exists to arbitrate access to resources. Examples include, but are not limited to, mutexes, semaphores, futexes, critical sections and monitors. All serve similar purposes and often vary little from one implementation and operating system to another. In the following, the term "Lock" is used to designate any and all such locking mechanism. Properly written multi-process and multi-threaded application use locking to arbitrate access to shared resources The context of the present invention is an application on the primary server (primary application or the primary) and one or more backup applications on backup servers (also called the replicas or backups). While any number of backup-servers with backup applications is supported the disclosures generally describe the scenario with one backup. As is obvious to anyone skilled in the art this is done without loss of generality.

As part of loading the primary application interceptors are installed. The interceptors monitor the primary applications activities and sends messages to the backup. The backup uses said messages to enforce the primary's execution order on the backup thereby ensuring replica consistency.

A key element of the present invention is thus the combined use of interceptors and a messaging subsystem to provide replica consistency.

Another aspect of the present invention is that the replicate consistency is achieved without requiring any application modifications. The application replication is provided as a system service and is fully transparent to the application.

Another aspect of the present invention is the use of sequence numbering to capture the execution stream of for multi process and multi threaded applications. Yet another aspect is the use of the sequence numbers on the backup to enforce execution that is in virtual synchrony with the primary.

Yet another aspect of the present invention is a messaging layer that provides guaranteed ordered delivery of messages, even if the underlying transport protocol doesn't provide guaranteed or ordered delivery.

Another aspect of the present invention is a reliable communication protocol that ensures ordered and reliable delivery of replication messages over both UDP and TCP on a LAN or a WAN. A related aspect of the reliable communication protocol is that it is non-blocking, i.e. that the primary executes at full speed, while the backup execute as replication messages are received, and the ordered and reliable delivery is ensured even if the underlying transport protocol does not provide guaranteed ordered delivery. Another related aspect is the acknowledgement (ACK) of received messages and the request for re-transmission (REQ) in the case of lost of missing messages.

Yet another aspect is a Message Processing Unit (MPU) responsible for receiving messages and hiding the ACK/REQ sequences from the backup applications.

Another aspect of the present invention is the combined use of replication, the messaging layer, checkpointing, and logging to provide live migration in response to both deterministic events and faults. Yet another aspect of the present invention is the use of a special replication message to trigger a synchronous live migration without the use of checkpointing, while another aspect is asynchronous live migration with the use of checkpointing.

A further aspect of the present invention is that it can be provided on commodity operating systems such as Linux and Windows, and on commodity hardware such as Intel, AMD, SPARC and MIPS. The present invention thus works on commodity operating systems, commodity hardware with standard (off the shelf) software without needing any further modifications.

One example embodiment of the present invention includes a system for providing replica consistency between a primary application and one or more backup applications, the system including one or more memory locations configured to store the primary application executing for a host with a host operating system. The system also includes an interception layer for the primary application intercepting calls to the host operating system and to shared libraries and generating replication messages based on said intercepted calls, a messaging engine for the primary application sending said replication messages to the one or more backup applications, and one or more additional memory locations are configured to store the one or more backup applications executing for one or more hosts each with a corresponding host operating system. The system further includes one or more additional messaging engines for each backup application receiving said replication messages from the primary application, and backup interception layers corresponding to each backup intercepting call to the operating system and shared libraries. The ordering information is retrieved from the one or more additional messaging engines for each backup application, and each replication message contains at least the process ID, thread ID and a sequence number, and replica consistency is provided by imposing the same call ordering on backup applications as on the primary application. The system further includes one or more message processing units (MPUs) used to ensure ordered message delivery, and pending acknowledgement queues (PAQs) to ensure message delivery.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a block diagram of the core system architecture for both primary and backups FIG. 2 is a block diagram illustrating a pair of primary and backup FIG. 3 is a block diagram illustrating Interception FIG. 4 is a block diagram illustrating creation of replication messages by the primary FIG. 5 is a block diagram illustrating the primary's messaging engine FIG. 6 is a block diagram illustrating a backup's messaging engine FIG. 7 is a block diagram illustrating handling of PROCESS messages FIG. 8 is a block diagram illustrating a backup's processing replication messages FIG. 9 is a block diagram illustrating I/O write processing FIG. 10 is a block diagram illustrating various deployment scenarios.

Figure 17:
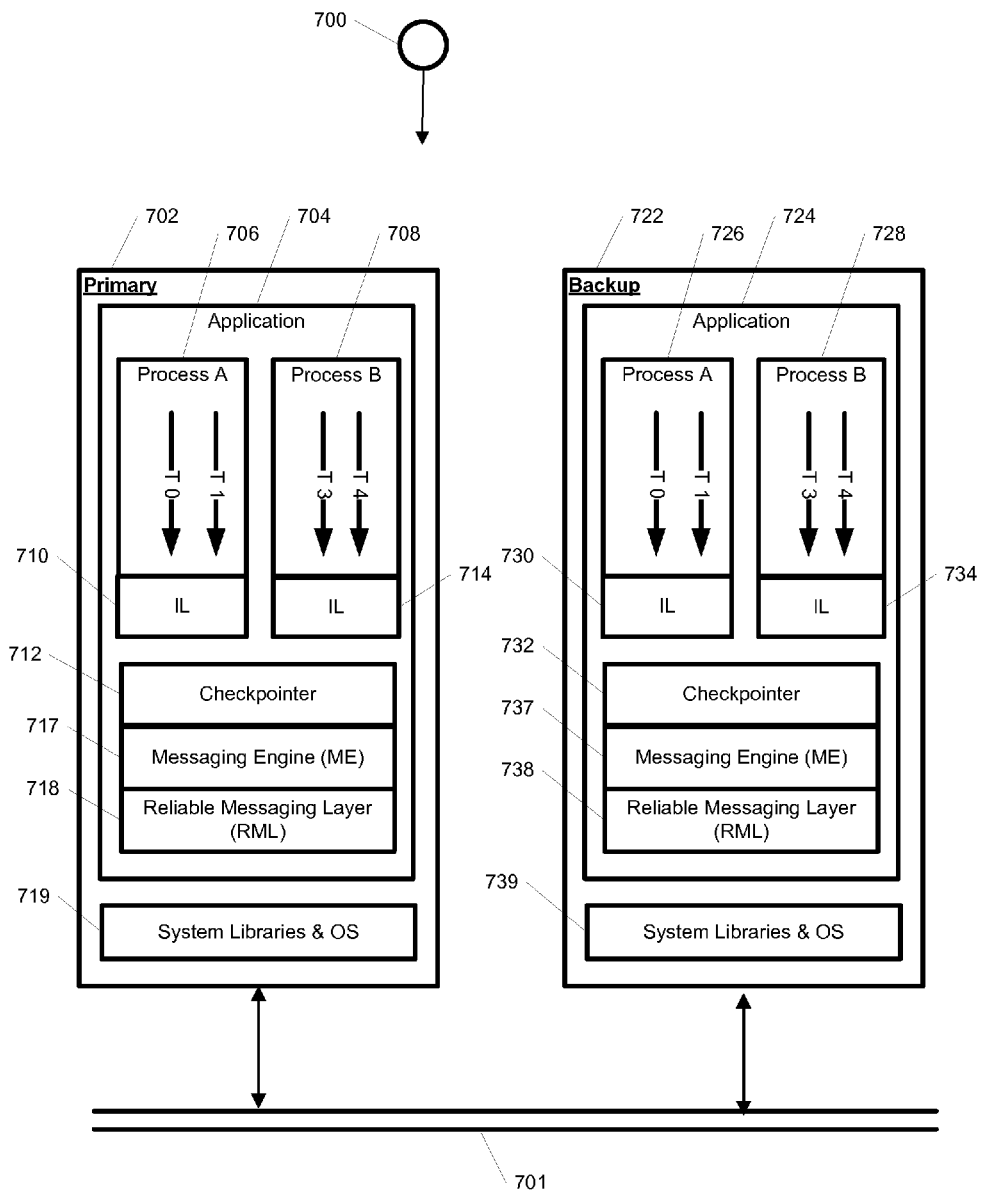
Figure 18:
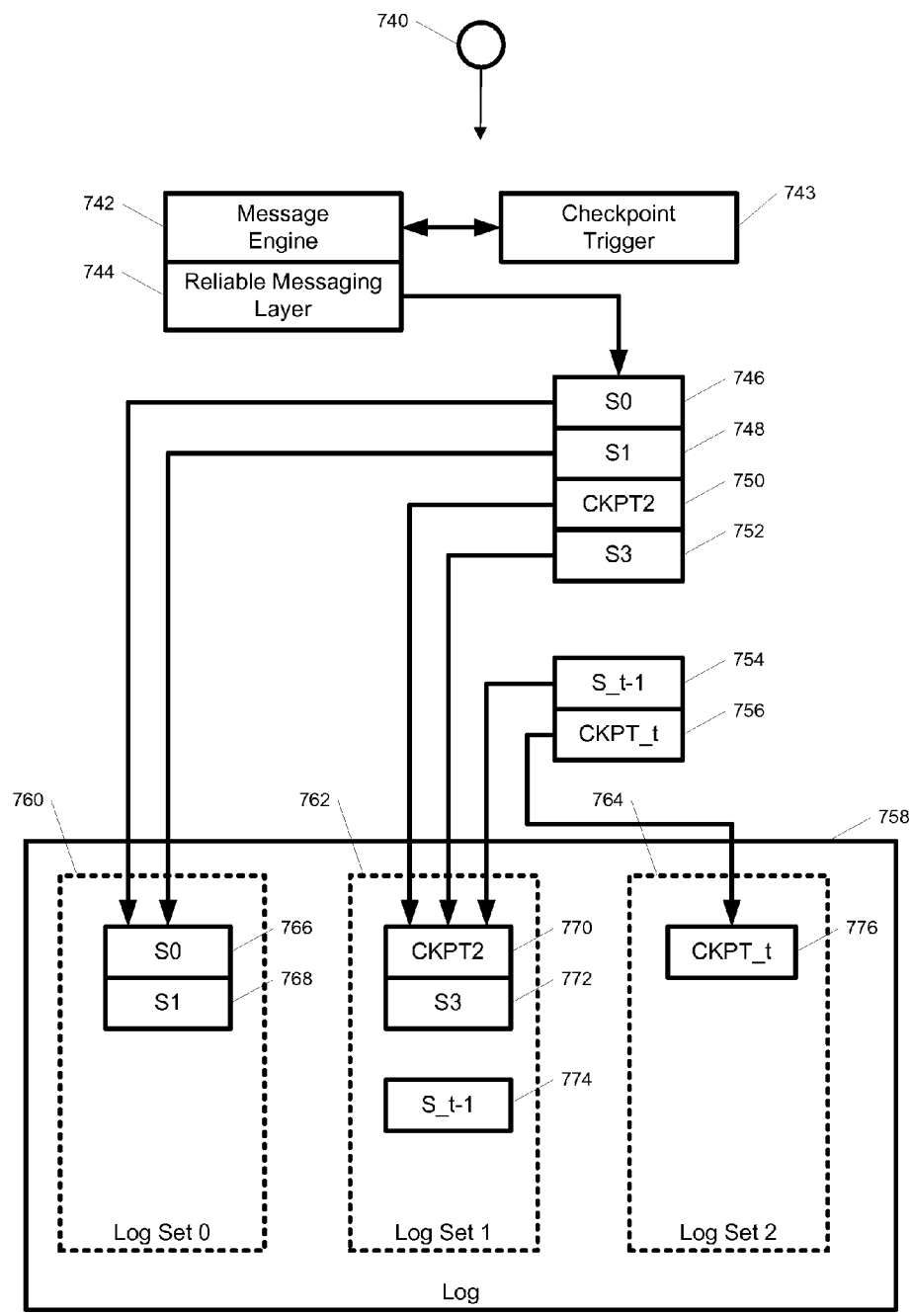
Figure 19:
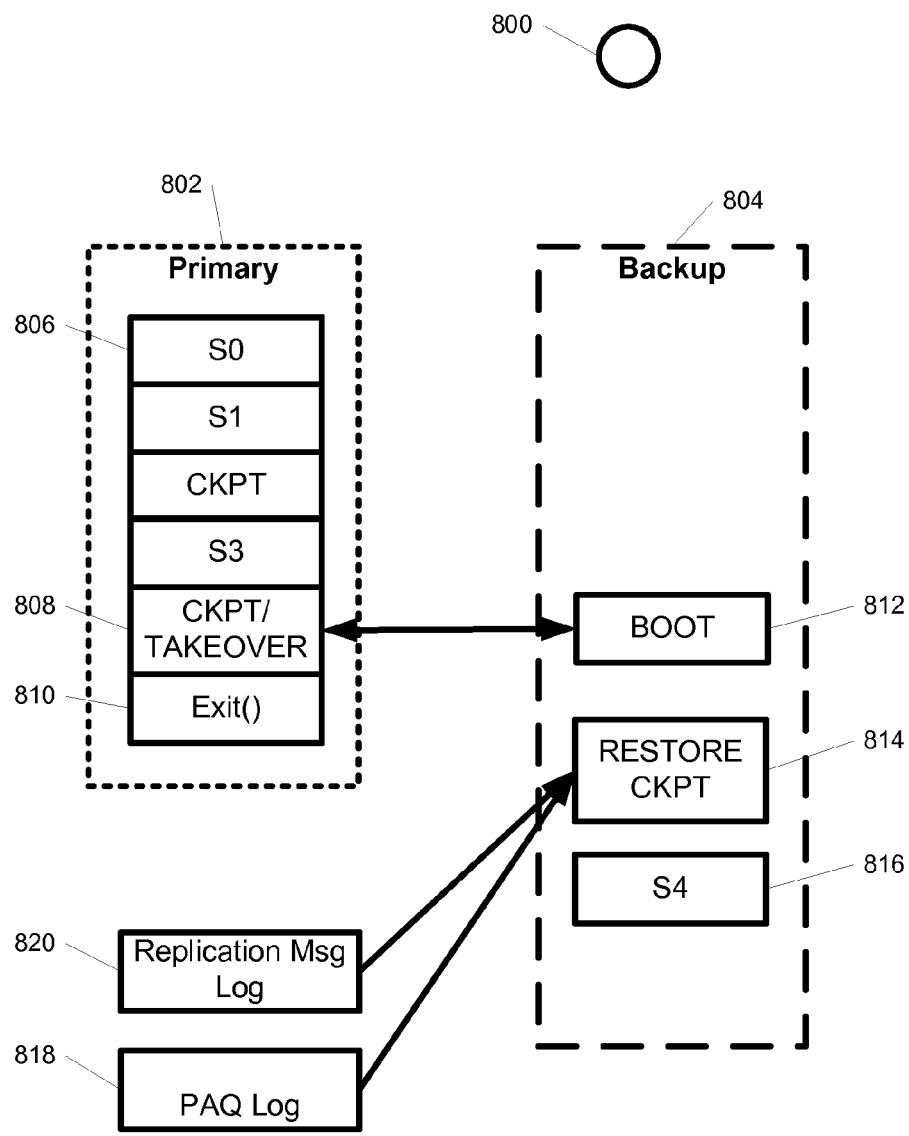
Figure 20:
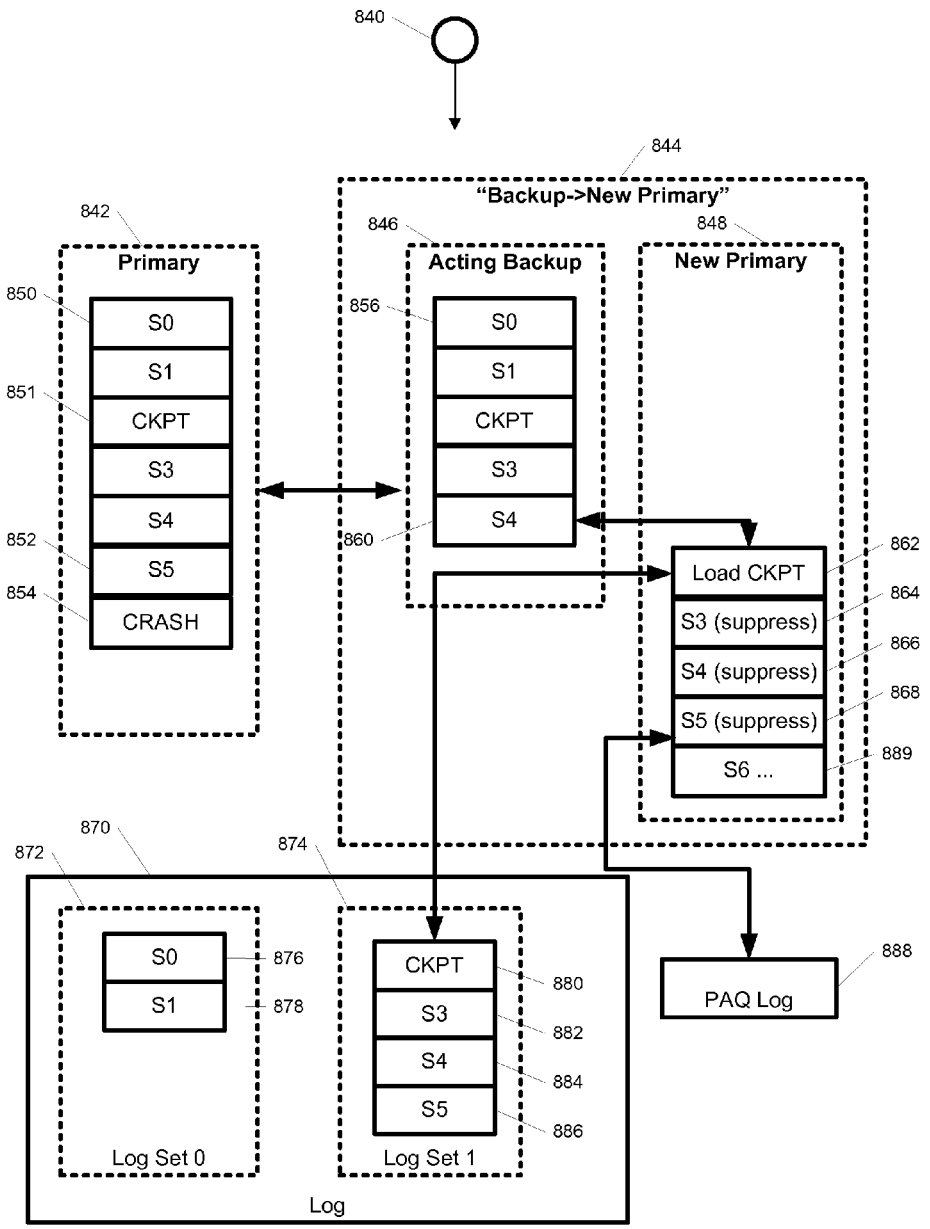
Figure 21:
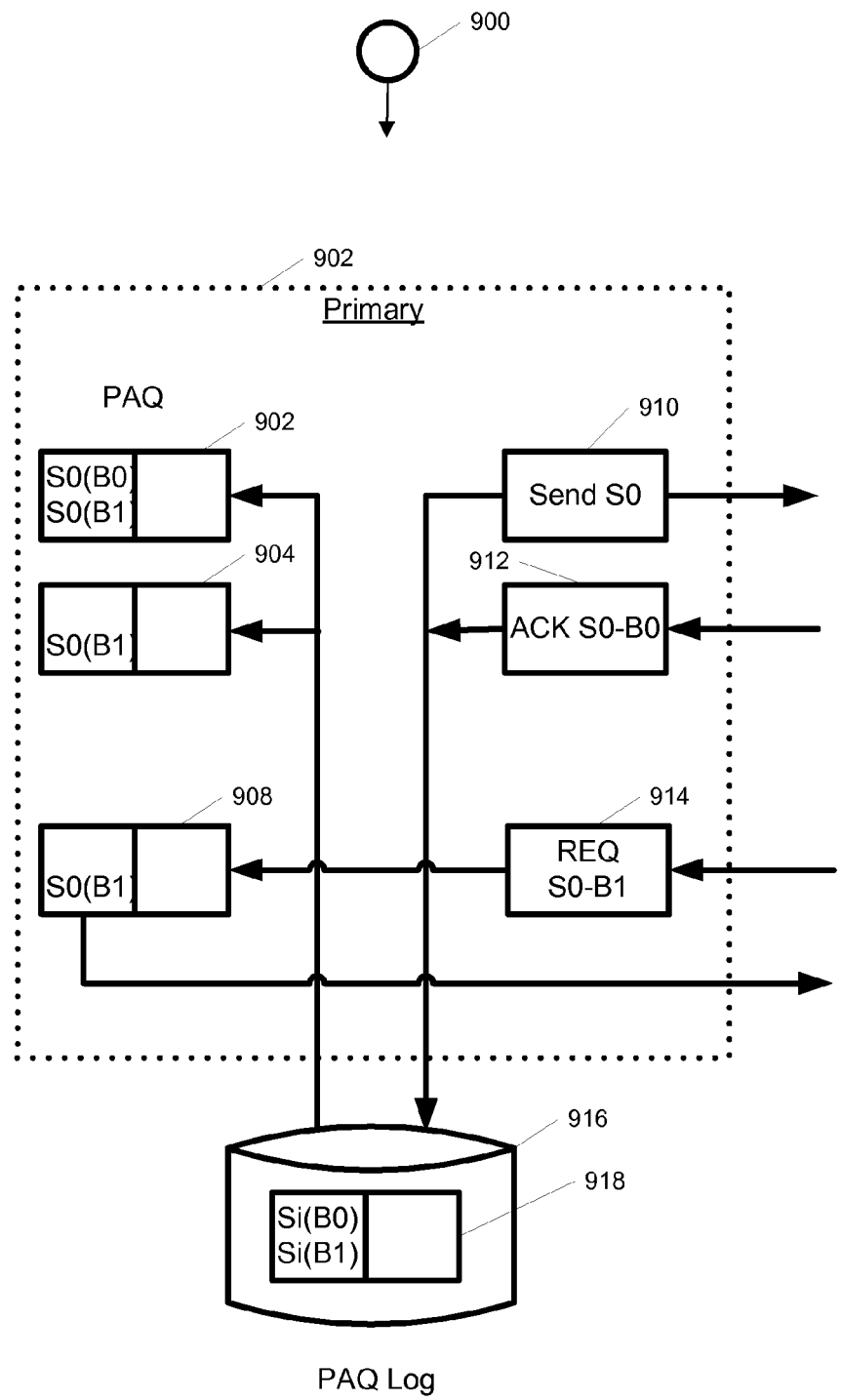
Figure 22:
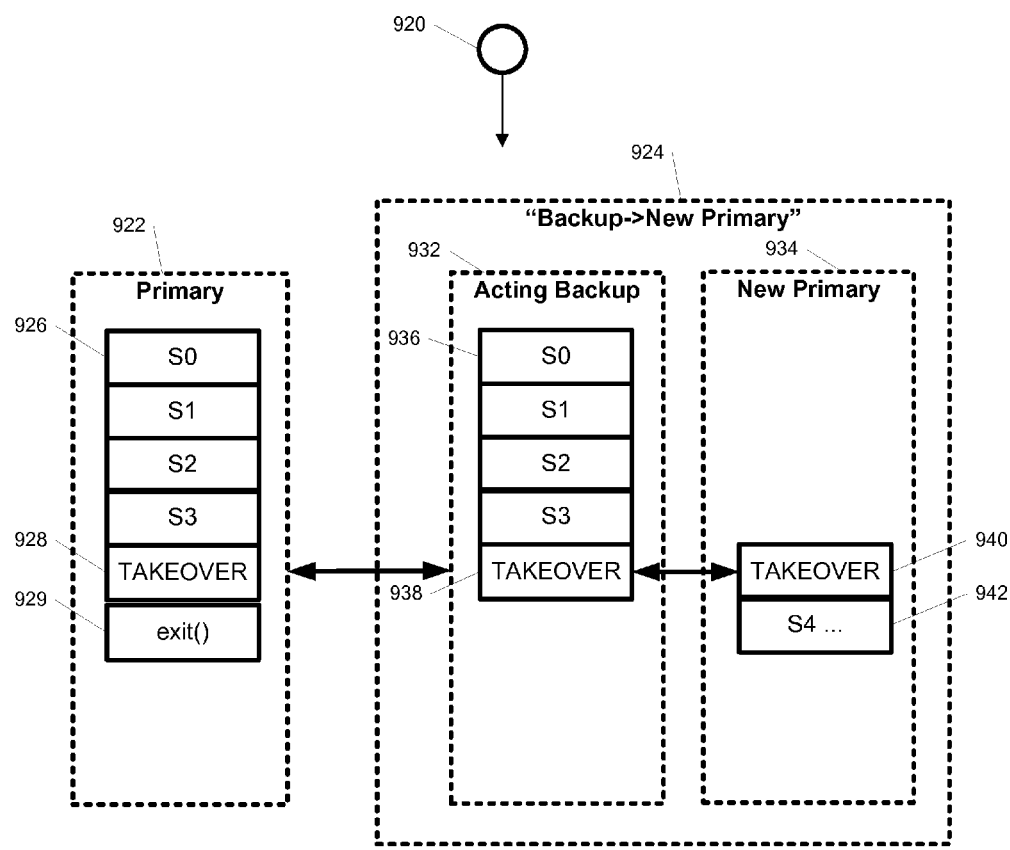
Figure 23:
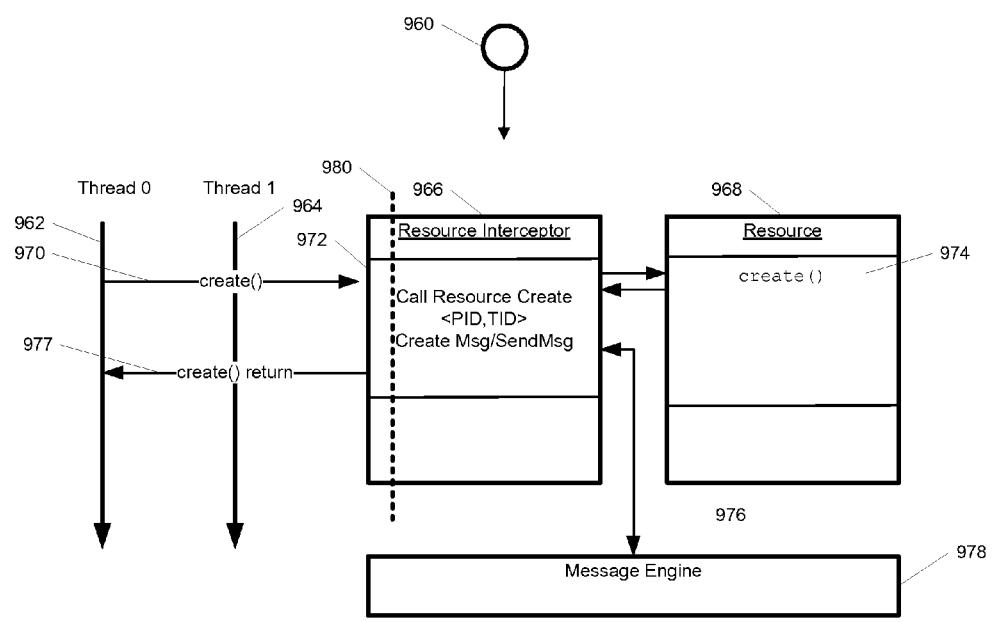

FIG. 17 is a block diagram illustrating the system architecture with checkpointing FIG. 18 is a block diagram illustrating logging of replication messages FIG. 19 is a block diagram illustrating cold failover FIG. 20 is a block diagram illustrating live migration FIG. 21 is a block diagram illustrating PAQ logging FIG. 22 is a block diagram illustrating Planned Live Migration FIG. 23 is a block diagram illustrating the barrier

DETAILED DESCRIPTION OF THE INVENTION

Referring more specifically to the drawings, for illustrative purposes the present invention will be disclosed in relation to FIG. 1 through FIG. 16 It will be appreciated that the system and apparatus of the invention may vary as to configuration and as to details of the constituent components, and that the method may vary as to the specific steps and sequence, without departing from the basic concepts as disclosed herein.

0. INTRODUCTION

The context in which this invention is disclosed is an application running on a primary server and one or more replicated instances of the application running on one or more backup servers. Without affecting the general case of multiple replicated backup applications, the following disclosures often depict and describe just one backup. Multiple backups are handled in a similar manner.

Similarly, the disclosures describe one primary application. Multiple applications are handled in a similar manner. Likewise, the disclosures generally describe applications with one or two processes; any number of processes is handled in a similar manner. Finally, the disclosures generally describe one or two threads per process; any number of threads is handled in a similar manner

1. OVERVIEW

Figure 1:
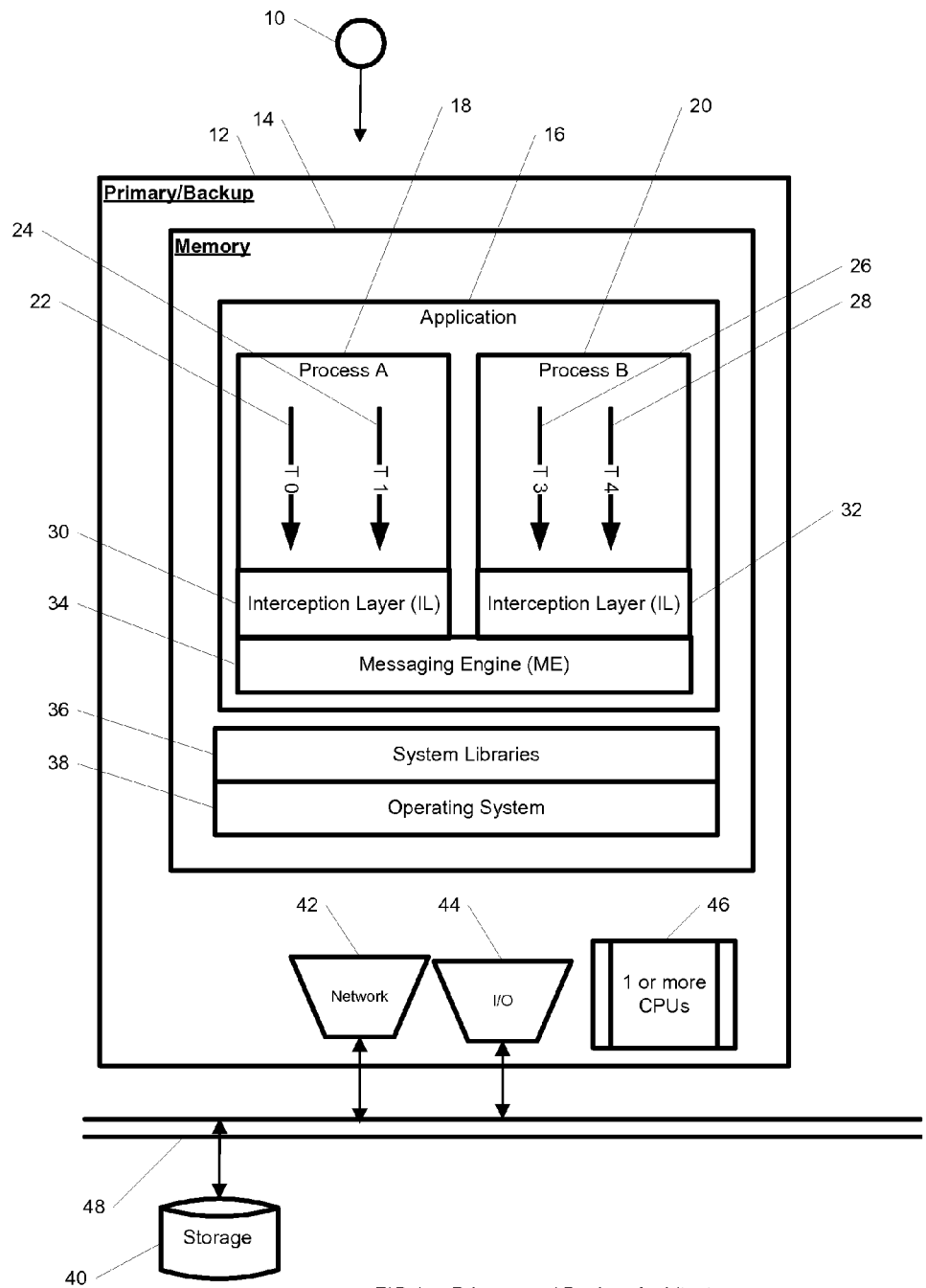

FIG. 1 illustrates by way of example embodiment 10 the overall structure of the present invention for both primary and backups. The following brief overview illustrates the high-level relationship between the various components; further details on the inner workings and interdependencies are provided in the following sections. FIG. 1. Illustrates by way of example embodiment a primary and backup server 12 with an application 16 loaded into system memory 14. The application 16 is comprised of two processes; process A 18 and process B 20. Each of the two processes has two running threads. Process A contains thread T0 22 and thread T1 24, while process B is contains thread T3 26 and thread T4 28. An interception layer (IL) 30,32 is interposed between each application process and the Messaging Engine (ME) 34, the system libraries 36 and operating system 38. Process A's interception Layer 30 and Process B's interception Layer 32 use the shared messaging engine (ME) 34 to send and receive messages used to enforce replicate consistency.

System resources, such as CPUs 46, I/O devices 44, Network interfaces 42 and storage 40 are accessed using the operating system 38. Devices accessing remote resources use some form of transport network 48. By way of example, system networking 42 may use TCP/IP over Ethernet transport, Storage 40 may use Fibre Channel or Ethernet transport, and I/O may use USB.

In the preferred embodiment storage 40 is external and accessible by both primary and backups.

The architecture for the primary and backups are identical. At the functional level, the Messaging Engine 34 generally is sending out replication messages on the primary, while the ME 34 on the backup is receiving and processing replication messages sent by the primary.

Figure 2:
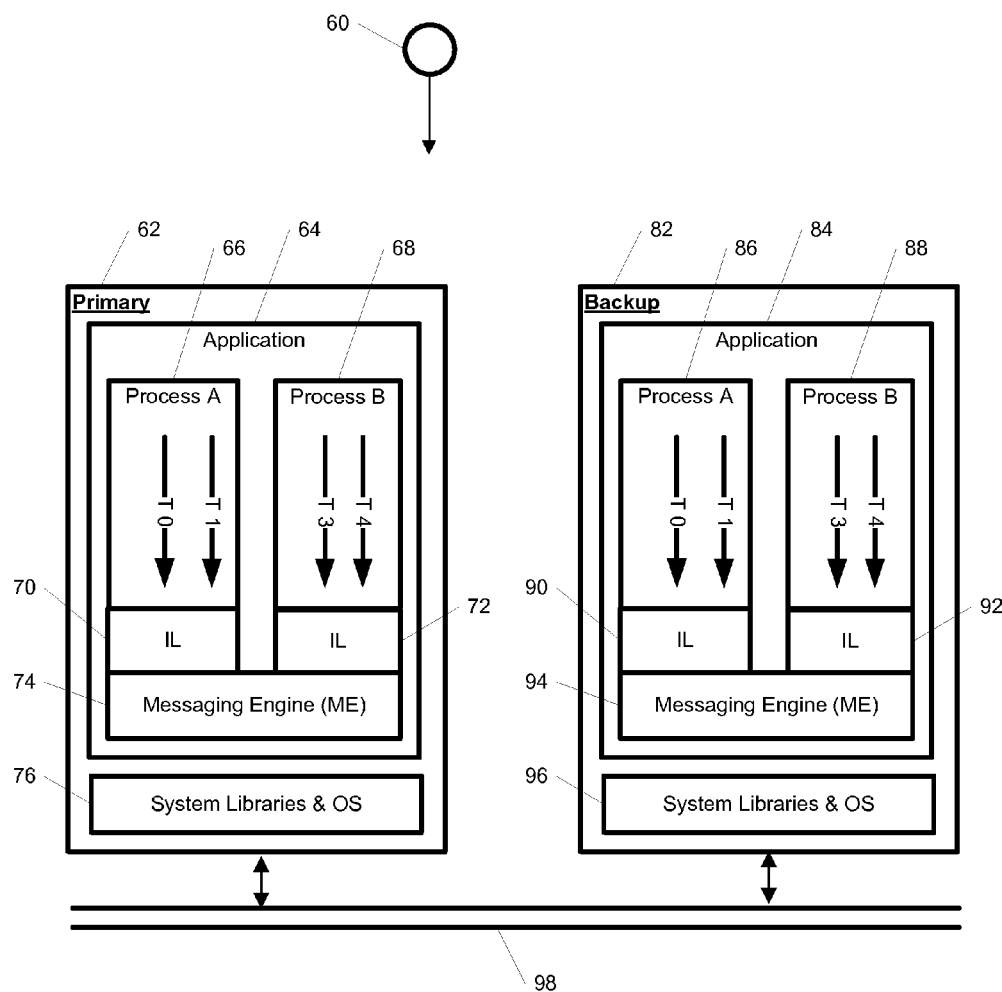

FIG. 2 illustrates by way of example embodiment 60 a primary server 62 and its corresponding backup server 82 working as a pair of primary and backup. The primary application 64 is comprised of two processes; process A 66 and process B 68, each with two running threads. Process A's interception layer 70 and the Messaging Engine 74 are interposed between process A 66 and the operating system and libraries 76. Likewise, Process B's interception layer 72 and the Messaging Engine 74 are interposed between process B 68 and the operating system and libraries 76.

Using a similar architecture, the backup server 82 contains the backup application (the replica) 84 comprised of process A 86 and process B 88 each with two threads. The Interception Layers IL 90 for process A and IL 92 for process B are interposed together with the Messaging Engine 94 between the two processes and the system libraries and operating system 96.

As illustrated on both FIG. 1 and FIG. 2 there is one Messaging Engine per application. If an application contains multiple processes, the application processes share one message engine.

2. INTERCEPTION

Figure 3:
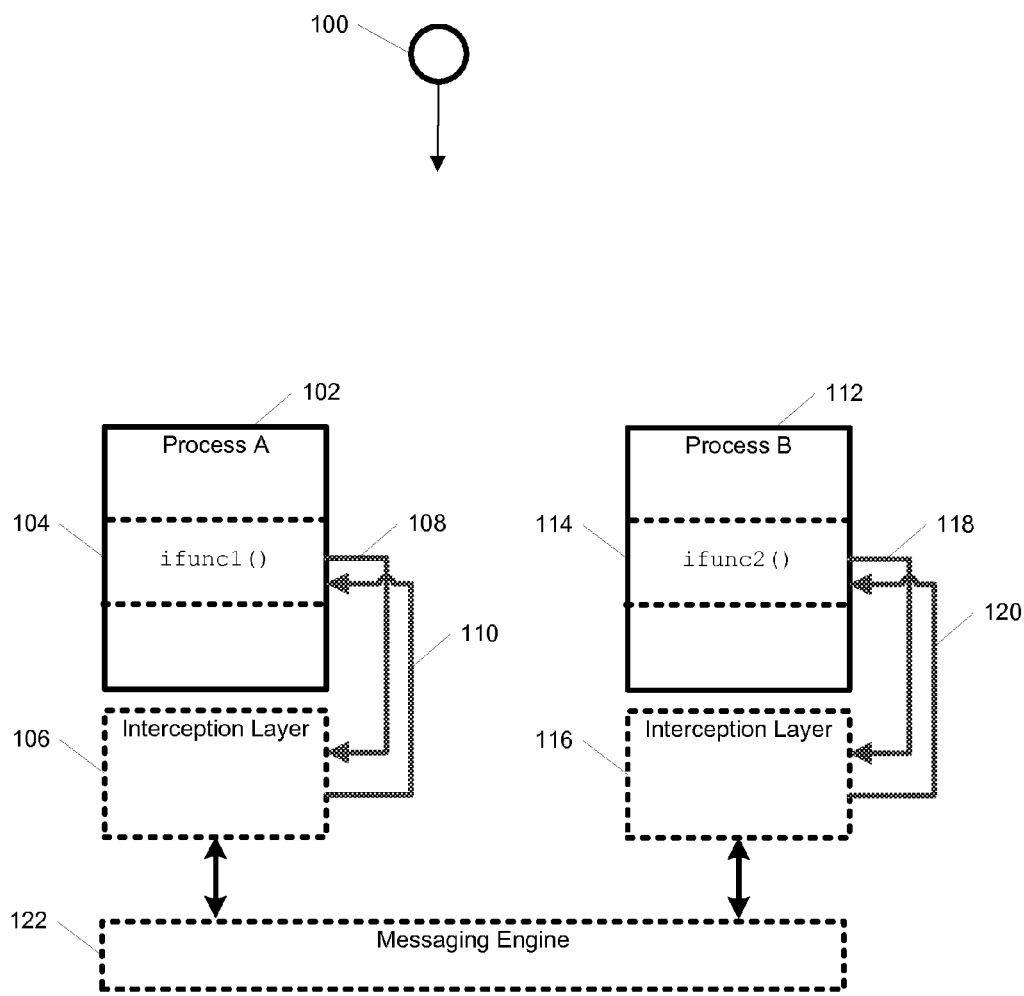

Interception is used to intercept all events, library calls and locking calls that affect replica consistency. FIG. 3 illustrates by way of example embodiment 100, the core interception architecture for an application with two processes. Details on the Messaging Engine and its architecture are given below. Process A 102 with interception layer 106, and process B 112 with interception layer 116. By way of example, ifunc1( ) and ifunc2( ) are subject to interception. When process A 102 reaches ifunc1( ) it is intercepted 108 and the call redirected to the interception layer 106. The interception layers processes the ifunc1( ) calls as follows (in pseudo code)

Call ifunc1( ) and store return values
Collect ProcessID and ThreadID for ifunc1( )
Call Message Engine 122 with (ProcessID,ThreadID) identifiers and any data from ifunc1( ) as necessary
Return to caller 110

Upon returning to the caller 110 Process A resumes execution as if ifunc1( ) had not been intercepted.

The interception mechanism is identical for process B 112, where ifunc2( ) 114 is intercepted 118, the interception processed 116 with the same algorithm, and then returned 120 to the caller.

In a preferred embodiment the interception layer is implemented as a shared library and pre-loaded into each application process' address space as part of loading the application.

Shared libraries are implemented in such as way that each instance of the interception layer share the same code, but have their own private data. In a multi-process application the interception layer is therefore comprised of one interception layer per application process, and together the process-level interception layers comprise the interception layer for the entire application.

A related issue with interception is that intercepted functions may call other intercepted functions. As long as said calls are performed using public intercepted names, the previous teachings fully describe the interception. At times shared-library developers take shortcuts and don't use the public names, but refer directly to the implementation using a private name. In such cases, the interceptor must overlay a copy of the intercepted shared library code using fully resolved public function names.

3. REPLICA CONSISTENCY

Even with correctly written multi-process and multi-threaded programs, there are no guarantees that the same program run multiple times produces the same result at each run. By way of example consider an application consisting of two threads. The program contains one global variable, one global lock, and two threads to operate on the global variable. In pseudo code:

```
main( )
{
  int globalInt=0;
  Lock globalLock=new Lock( );
  Start thread1;
  Start thread2;
  Print("Final value="+globalInt);
}
private thread1( )
{
  for(int i=0; i<10; i++)
  {
  globalLock.lock( );
  globalInt=globalInt+1;
  globalLock.unlock( );
  sleep(random( );
  }
}
private thread2( )
{
  for(int i=0; i<10; i++)
  {
  globalLock.lock( );
  globalInt=globalInt*2;
  globalLock.unlock( );
  sleep(random( );
  }
}
```

Thread 1 repeats the core loop 10 times and each time first locks the global lock to ensure atomic access to globalInt, increments globalInt by one, frees the lock and waits a random amount of time. Thread2 has the same structure except it multiplies globalInt by 2.

Depending on how long each thread sleeps each time they reach sleep( ) thread1 and thread2 will execute their locks in different orders and thus globalInt is not guaranteed to be the same at the end of separate runs To ensure replica consistency, the present invention enforces an ordering on events, so that the primary and backup produces the same results. Specifically, if the application runs on the primary and produces a final value of 10, so will the backup. If next time the primary produces the final value of 10240, so will the backup.

While the use of sleep( ) highlighted the consistency problem, even without sleep( ) different runs would produce different final results. The reason is that the operating system schedules Tread 1 and Thread 2 based on a wide range of factors, and likely will make different scheduling decisions from run to run.

4. GENERATING UNIQUE GLOBAL IDS

The present invention utilizes global IDs in several places. A "global ID" is a 64 bit integer that is guaranteed to be unique within the context of an application. When a new global ID is created it is guaranteed to be one larger than the most recently generated global ID. Global IDs are used as counters for replication messages. Global IDs start at zero upon initialization and continue to increase as more global IDs are requested. 64 bits ensures that integer wrap-around is not a practical concern. In an alternate embodiment global IDs are implemented as arbitrary precision integers, which can hold any size integer and never wrap.

In a preferred embodiment generation of global IDs are provided in a shared library. On some operating systems, shared libraries can have variables, called static library variables, or global library variables, that are shared across all instances of the shared library. For such operating system, the preferred implementation uses such global library variables to implement the global IDs. In pseudo code the implementation is, where "m_GlobalID" is the global shared variable:

```
static Int64 m_GlobalID=0;
Lock m_GlobalIDLock=new Lock( );
  static int64 createGlobalID( )
  {
  Int64 id=m_GlobalID;
  m_GlobalIDLock.lock( );
  m_GlobalID=m_GlobalID+1;
  id=m_GlobalID;
  m_GlobalLock.unlock( );
  return id;
  }
```

Alternatively, if the operating system doesn't support global variables within shared libraries, the same functionality can be implemented using shared memory, using, by way of example, the POSIX shared memory subsystem found on modern operating system. Instead of using a static Int64 to hold the m_GlobalID, the m_GlobalID is placed in a shmem segment shared among all instances of the shared library and locked using a named semaphore This alternate technique is substantially identical to the algorithm above other than the use of shared memory instead of library static variable In a preferred implementation the global ID functionality is built into to the Messaging Engine shared library. In an alternate implementation, the global ID functionality is provided in a separate shared library. In the following disclosures the global ID functionality is depicted as being provided by the Messaging Engine shared library, per the preferred implantation.

5. IDENTIFYING RESOURCES

As a thread executes it proceeds along a unique path. Generally a thread runs within the context of a process. The process has a unique identifier, called the process ID or PID, and each thread has a unique identifier called the thread ID or TID. In some operating systems thread IDs are globally unique, in others unique within the context of its parent process. The combination of PID and TID uniquely identifies a thread and process pair independently of whether TIDs are globally or process unique. On many operating systems the PID is determined by the getpid( ) or GetProcessId( ) functions, while the TID is determined by the gettid( ) or GetThreadId( ) functions. Other operating systems offer similar functionality.

As an application is loaded control is first transferred from the loader to the applications init( ) method. Generally, init( ) is provided as part of the standard system libraries but custom init( ) may be provided. Init( ) ends by calling the main application entry point, generally called main( ). As main( ) starts executing it does so as one process with a single thread. The teachings of the present invention follow this model where each process automatically is created with one thread, where said thread is executing the initial program code. There are operating systems where every thread must be created programmatically and where no initial thread is attached to a process. The present invention supports adding threads to a running process at any time, and it's thus apparent to anyone skilled in the art that the following disclosures easily adapt to the case where a thread needs to be programmatically added following process creation.

In the preferred embodiment, the present invention supplies a custom init( ) wherein all interceptors are loaded. This ensures that all resources, including threads and processes, can be intercepted and that the interceptors are installed before the application's main( ) is called.

The process and thread interceptors intercept all process and thread creation, termination and exits. As the primary application executes and uses threads and processes, said events are communicated using Replication Messages (described below) to the backup providing the necessary information for the backup to rebuild the process and thread hierarchy and match it against incoming replication messages from the primary.

By way of example, as init( ) calls main( ) the programs consists of one process with one thread. Prior to calling main( ) a special initialization replication message (called PROCESS_INIT) with the initial process ID and thread ID is sent to the backups. When a new process is created the new process ID together with its initial thread ID are sent to the backup in a replication message (PROCESS_CREATE). Whenever a new thread is created, a replication message with the process ID and new thread ID are sent to the backup (THREAD_CREATE). Likewise, whenever a process or thread terminates a replication message with the terminating process and thread is sent to the backups. The backup can thus build a representation of the process and thread hierarchy on the primary and use that to map incoming replication messages against the backup's own process and thread hierarchy.

To ensure replica consistency, access to all resources is intercepted and tagged, so that the identical access sequence can be imposed on the replica. The first set of interceptors intercept all process and thread creation and termination calls. Tracking the process and thread hierarchy on the primary enables recreation of the hierarchy on the replica. The process and thread <PID,TID> pair is attached to all resource access performed on process PID and thread TID and provides the tagging necessary to associate resource interceptors on the backup with the corresponding process and thread on the primary.

As a thread executes it does so sequentially. While a multi process and/or multi threaded application may contain many simultaneous executing threads and processes, each thread is performing its work serially. By way of example consider the following pseudo code:

```
FILE *fp=fopen("/home/user/newfile.txt", "w")
   if (fp !=null)
   fwrite (pStr,1, strlen(pStr),fp);
   fclose (fp)
```

The thread first opens the file using fopen( ), then writes to the files with fwrite ( ), and finally closes the file with fclose( ). The program will not, by way of example, first call fwrite( ) then fclose( ), and finally fopen( ). The instruction sequence, as it relates to the resource FILE *fp, is guaranteed to be sequential as programmed in the example code. Compilers may rearrange some of the compiled code as part of code generation and optimization, but it will always leave the resource access ordering as specified in the source code. If the compiler re-arranges other aspects of the code execution, the same rearranged order would be in place on the backup, and such compiler optimization thus have no effect on the teachings of the present invention.

By way of example, this means that a thread on the primary and the backup both would first call fopen( ) then fwrite( ) and finally fclose( ). The present invention uses this implicit ordering to map replication messages against the right methods. By way of continued example, the backup would first, as this is how the program executes, request the replication message for fopen( ) then for fwrite( ) and finally for fclose( ) and thus automatically match the ordering of Replication Messages generated by the primary as far as the resource FILE *fp is concerned.

If, by way of example, a thread uses two resources the same teachings apply. While the compiler may have rearranged the relative order of the two resources, said reordering would be identical on primary and backups and thus not affect any difference in execution on the primary and the backups.

If by way of example, an execution environment such as Java or .NET is used, said execution environment is included as part of the application as the execution environment affects and controls execution.

There is thus no need to assign any resource identifiers to resources in order to match resource on the primary with the resource on the backup. The execution context itself suffices to identify a resource and its use within the context of a thread and process. By way of example, the creation of a resource by a process and thread is used directly to match it to the corresponding process and thread on the backups. The matching on the backups is explained in detailed below.

By way of example consider a process with two threads. The two threads access a shared lock and arbitrate for access using the lock( ) and unlock( ) methods. In pseudo code

```
Lock globalLock=null;
private thread1( )
{
   globalLock=new Lock( );// create
   globalLock.lock( );
   // do thread 1 work
   globalLock.unlock( );
}
private thread2( )
{
   globalLock.lock( );
   // do thread 2 work
   globalLock.unlock( );
}
```

Figure 4:
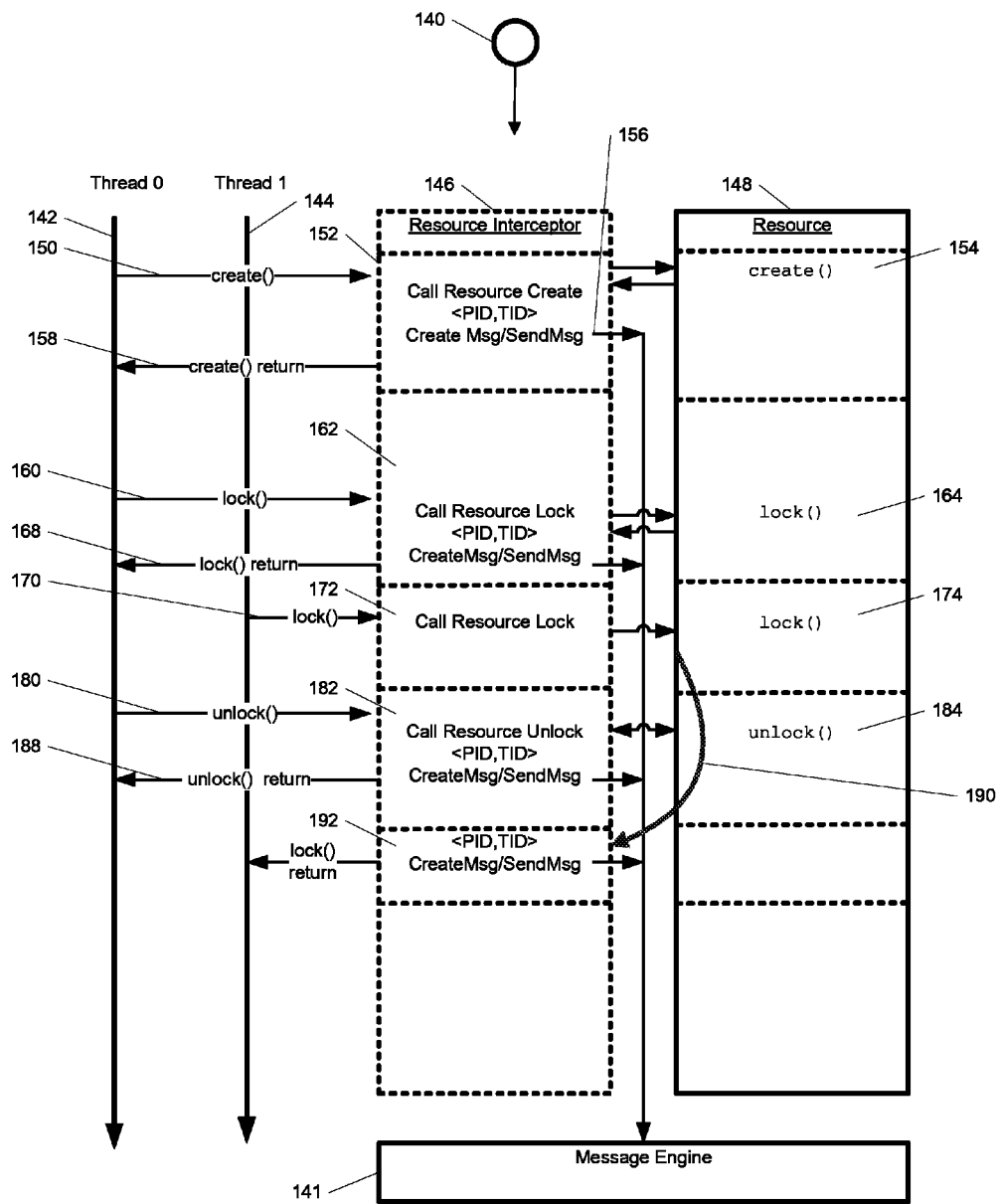

FIG. 4 illustrates by way of example embodiment 140, the interception of Lock objects in a scenario with two threads and the creation of <PID,TID> pairs. A process is comprised of two threads, Thread-0 142 and Thread-1 144. The resource interceptor 146 intercepts access to the underlying Lock resource 148. First Thread-0 142 creates 150 the lock. The create( ) call is intercepted 152 by the resource interceptor 146. First the actual resource create( ) 154 call is performed and the returning value stored. A replication message with the pair <PID,TID> is created and sent 156 to the Message Engine 141 for transmittal to the backup. Finally the creation call return 158 the results of the resource create ( ) call. Later the Thread-0 142 calls the lock( ) method 160 on the Lock object. The lock( ) is intercepted 162, and initially forwarded to the lock( ) call within the Lock object 164. The lock is returned to the interceptor 162, and a replication message with <PID,TID> is created and sent to the Messaging Engine. The lock is returned 168 to thread-0. At this point thread-0 has acquired the Lock and no other threads are can acquire it while the Lock is held by thread-0.

Later thread-1 144 calls the lock( ) method 172 on the Lock object. The lock( ) is intercepted 172 and initially is forwarded to the lock( ) call within the Lock object 174. The lock( ) 174 blocks as the lock is already acquired by Thread-0 and the call does not return to the interceptor and thread-1 144.

Later thread-0 142 calls the unlock( ) method 180 on the Lock object. The unlock( ) is intercepted 182 and forwarded to the Lock object 184. The Lock object processes the unlock( ) 184 and returns to the interceptor 182. A replication message with <PID,TID> is created and sent to the Message Engine 141. The unlock( ) call returns 188.

Thread-2 can now acquire the lock 174 and the lock( ) call return 190 to the interceptor 192 where a replication message with the <PID,TID> pair is constructed and sent to the Messaging engine.

5.1 Resource Types

The present invention breaks resources down into distinct categories and handles each separately:

1. Processes and Threads and their Methods:

processes and threads methods are intercepted and used to build a mapping between processes and threads on the primary and backup.

2. Locks and their Methods:

Locks are intercepted and used to enforce replica consistency relative to locks and their use 3. I/O Resources and their Methods:

I/O (Input/Output) resources are resources writing data to locations outside the application or reading external data into the application. I/O Resource methods are intercepted and additional replication messages corresponding are added. Example I/O resource methods that write data include, but are not limited to, write( ) for files, srand(n) where the srand(s) sets the seed value for a random number generator, and sendmsg( ) from the sockets library. All three examples write data to a location outside the application proper. Example I/O resource methods that read data include, but are not limited to, read( ) for files, rand( ) to generate a random number, gettimeofday( ), and readmsg( ) from the sockets library. All four examples reads or generates external data and delivers it into the application proper.

4. Other and Special Cases.

All classes of resources are included in the teachings of the present invention. I/O Resources are the most general type of resource and provide additional information in the replication messages. Any resource not included in the first two groups is treated as an I/O resource even though the functionality may not be I/O related.

6. REPLICATION MESSAGES

Replication Messages use the following Layout
METHOD_ID, Sn, PID, TID, DATA
Where "METHOD_ID" is one of a few pre-defined method IDs, "Sn" is the replications sequence number, "PID" is the process ID, "TID" is the thread ID, and "DATA" is an additional field that in some case carry extra information.

The sequence number is a global ID generated and added by the Messaging Engine to every replication message. Each new sequence number is exactly one larger than the previous sequence number, and is used on the backup to impose the same ordering as on the primary.

Example METHOD_IDs include
PROCESS_INIT used to initialize the process and thread hierarchy
PROCESS_CREATE used to designate the creation of a new process
THREAD_CREATE used to designate the creation of a new thread
PROCESS_EXIT used to designate the termination of a process and associated threads
THREAD_EXIT used to designate the termination of a thread
METHOD_NONE used to designate that no special method ID is required In the preferred embodiment, Method IDs are integers and predefined. In the preferred embodiment METHOD_NONE is defined as zero or null, indicating that the method is implicitly provided via the sequential execution of the thread.

Every time a resource is created, accessed, or used a replication message is created on the primary and sent via the messaging engine to the backup. The replication message contains the process and thread where the resource was accessed and a sequence number ensuring strict ordering of events. To distinguish the replication messages from the surrounding text it is at times enclosed in "<" and ">". Those special characters are not part of the replication messages and are used entirely for clarify of presentation.

As disclosed previously, the implicit ordering of execution within a thread is used to order resource access and the present invention thus does not need to specify the nature of the intercepted method; the interception ordering is identical on the backups and the corresponding primary. Therefore, most replication message has a METHOD_ID of METHOD_NONE as the primary and backup process the resource requests in the same sequential order and need no further data to indentify resource and interception.

Continuing the example embodiment referred to in FIG. 4, the messages generated by the Resource Interceptor, has a process ID of 'P', thread ID of T0 for Thread-0 142, and thread ID of T1 for Thread-1 144. By way of example we identify the sequence numbers as S0, S1, S2 etc.

| METHOD_NONE, S0, P, T0 | // new Lock( ), Thread 0 |
| METHOD_NONE, S1, P, T0 | // lock( ), Thread 0 |
| METHOD_NONE, S2, P, T0 | // unlock( ), Thread 0 |
| METHOD_NONE, S3, P, T1 | // lock( ), Thread 1 |

Where everything after and including "//" are comments included only for clarity of presentation The messages and the ordering implied by the ever increasing sequence numbers S0, S1, S2 and S3 describe the ordering, use and access of shared resources. If a library method exists in two variants with different signatures, each method is intercepted and generates its own message, if Lock.lock( ) had two different signatures, and thread-1 144 used the alternate method, the replication messages would look the same, as the backup automatically would be executing the alternate lock implementation on thread-1 as well.

```
METHOD_NONE, S0, P, T0
METHOD_NONE, S1, P, T0
METHOD_NONE, S2, P, T0
METHOD_NONE, S3, P, T1      // second lock( ) signature
```

If the operating system provided two methods to create new processes, there would be both a PROCESS_CREATE and PROCESS_CREATE2, where PROCESS_CREATE2 designates the alternate method to create processes.

As disclosed above, process and threads require special consideration and have their own replication messages. Upon creating a new process a special PROCESS_CREATE replication message is sent to the backups. The PROCESS_CREATE identifies the new process ID, its corresponding thread ID and its parent process. The parent process ID is encoded in the DATA field. Upon creating a new thread, the new thread ID, its corresponding process' PID, and the threads parent thread ID encoded in the DATA field, is sent within a THREAD_CREATE replication message to the backups. Depending on when the operating system schedules the new process and thread they will get to run either before or after the parent process and thread. On the backups, the messaging engine may thus receive messages from the newly created process or thread before receiving the PROCESS_CREATE or THREAD_CREATE replication messages, or alternatively receive requests for PROCESS_CREATE or THREAD_CREATE messages before the messages from the primary have arrived. The messaging engine on the backups automatically suspends requests from the new processes and threads until the mapping of process and thread ID have been established as disclosed later.

By way of example, the process replication messages corresponding to a program starting, creating one new process called P1, then terminating P1, are:

```
PROCESS_INIT,         S0, P0, T0
PROCESS_CREATE,       S1, P1, T1, P0
PROCESS_EXIT,         S2, P1, T1
```

Where S0, S1 and S2 are the sequence numbers, P0 the process ID of the initial process, T0 the thread ID of the thread for P0. P1 is the process ID of the created process while T1 is the thread ID of the first thread in P1. The parent process's process IDs is provided as DATA for PROCESS_CREATE. PROCESS_INIT is the special previously disclosed initialization message sent just prior to entering main( ).

At times a replication message optionally includes additional data. The data is appended in the DATA block and transmitted along with the core replication message. The DATA block contains the DATA identifier, a 64 bit long identifying the length of the data block, and the data itself. By way of example, a replication message for a fwrite( ) operation may look like METHOD_NONE S0, P0, T0, {DATA, len, datablock}

DATA blocks are used primarily to send complex data such as data written to files, results of operations and success/ failure of operations. The DATA blocks are primarily used with I/O Resources. The curly brackets "{" and "}" are not part of the message, they are used here for clarity of presentation. The DATA block is also used by PROCESS_CREATE to designate the parent process's PID.

7. MESSAGE ENGINE

Figure 5:
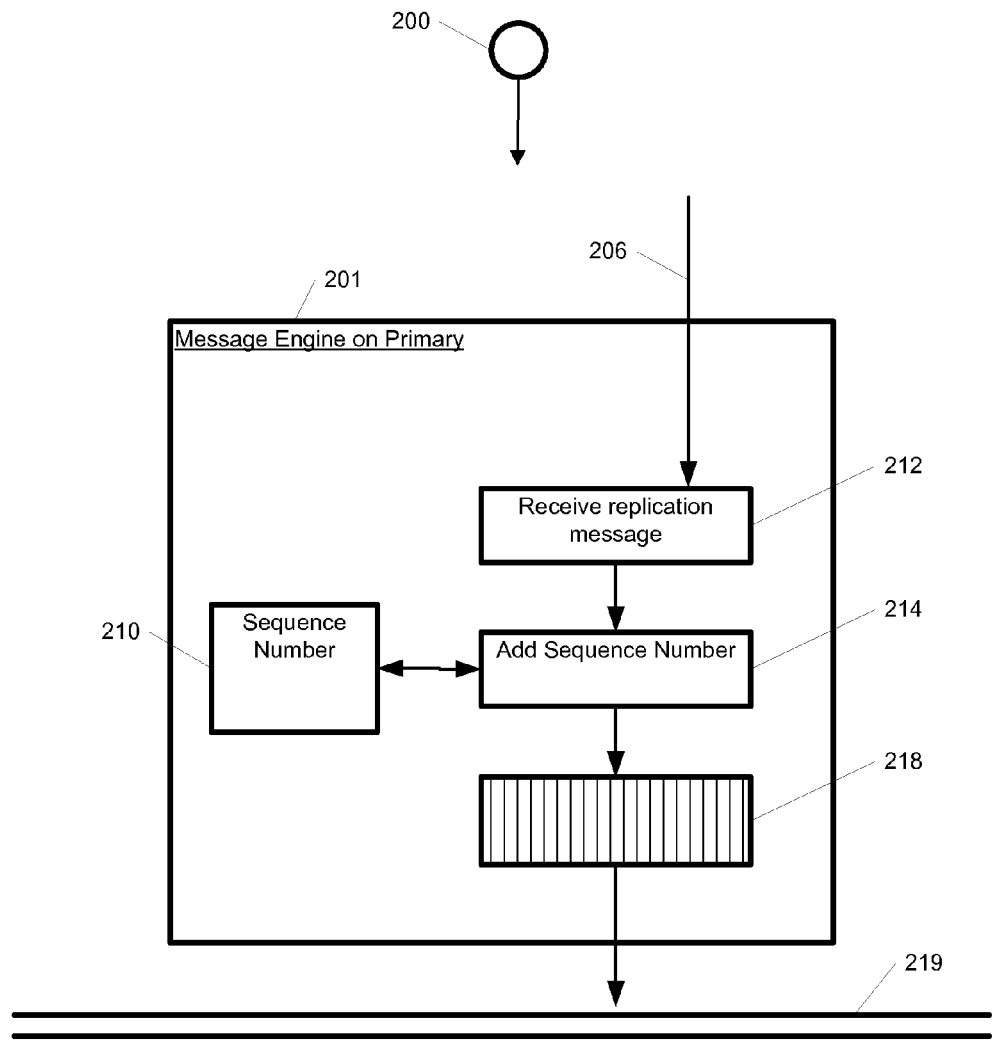

FIG. 5 illustrates by way of example embodiment 200, the structure of the Message Engine 201 on the primary. The base replication message is sent to the Message Engine 206 where it's received 212. A sequence number is requested 214 from the Sequence Number generator 210, and added to the message. The message is ready for transmission 218 to the backup over the network 219.

In the preferred embodiment Sequence Numbers are generated with the preferred Global ID embodiment disclosed above.

The message engine on the backup receives all the replication messages and sorts them by sequence number. The sequence number in the replication message identifies the order in which events previously took place on the primary, and therefore must be imposed on the backup during execution. As disclosed above and illustrated on the example embodiment on FIG. 4, the resource interceptor relies on the underlying operating system and system libraries to supply the native resource access and locking, and then tags on the process, thread, and sequence numbers to indentify the context and relative order.

Figure 6:
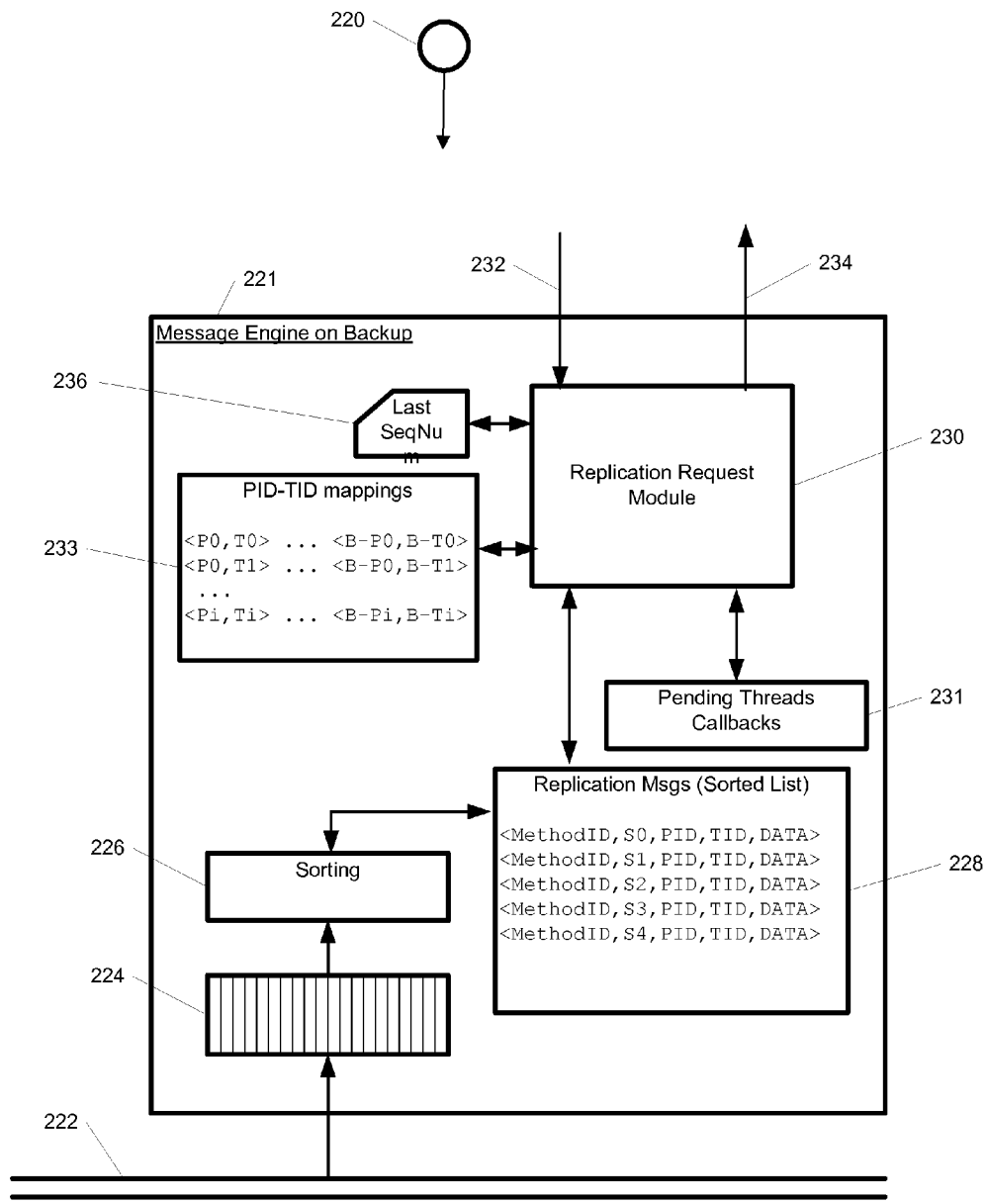

FIG. 6 illustrates by way of example embodiment 220 the Message Engine 221 on a backup. Replication messages are received 224 over the network 222. Replication Messages may arrive out of order and are therefore sorted 226 by sequence number. A sorted list of new messages 228 is maintained by the present invention within the Message Engine 221 on the backups. In a preferred embodiment replication messages are sent using a reliable non-blocking communication protocol. The protocol delivers the messages sorted by sequence number and no further sorting 226 is required. The non-blocking reliable messaging protocol is disclosed in section 10 below.

In alternate embodiments directly using UDP or TCP Replication Messages may arrive out of order: In an embodiment using TCP, TCP ensures message ordering. In an embodiment using UDP, there is no guarantee that messages arrive in the same order they were sent. In general, Replication Messages may thus arrive out of order and are therefore sorted 226 by sequence number. A sorted list of new messages 228 is maintained by the present invention within the Message Engine 221 on the backups By way of example, a message with sequence number 100 is sent, followed by a message with sequence number 101, they may arrive out-of-order on the backup, so that the message with sequence number 101 arrives prior to the replication message with sequence number 100. The sorting step 226 ensures that the oldest replication message with lowest sequence number is kept at the top, while later messages are placed in their sorted order later in the list 228

When the resource interceptors on the backup requests a replication message 232, the request is processed by the request module 230. In order to deliver a replication message to an interceptor two tests must be passed:

Test 1—Sequence Number:

The request module 230 compares the sequence number at the top of the sorted list of replication messages 228 with the sequence number of the most recent message 236. If top of the list 228 has a sequence number of exactly one more than the most recent sequence number 236 the top-message is a candidate for delivery to the calling interceptor 232, 234. If the top-message sequence number is more than one larger than the last sequence number 236, one or more replication messages are missing, and the request module 230 pauses pending the arrival of the delayed message.

By way of example, and in continuation of the example above, if the last sequence number is 99, and the message with sequence number 101 has arrived, while the message with sequence number 100 has not arrived, the request module 230 waits until the message with sequence number 100 has been received and placed at the top of the sorted list. Upon arrival of the replication message with sequence number 100, said message is now a candidate for delivery to the calling interceptor 232, 234 provided the second test passes.

Test 2—METHOD ID, Process ID and Thread ID:

The caller 232 supplies METHOD_ID, PID, TID and parent PID, when requesting a replication message. This means that the calling interceptor is requesting the oldest replication message of type METHOD_ID with process ID of PID and thread ID of TID.

When METHOD_ID is METHOD_NONE the requested method is implicit in the serial execution of the thread and it suffice to compare process ID and thread ID. By way of example, to retrieve the replication message for process B-P0 and Thread B-T1, the interceptor would supply parameters of B-P0 and B-T1 which are the process ID and thread ID of the interceptor and calling application on the backup. The replication messages contain PIDs and TIDs from the primary. As the backup executes, each process and thread generally have different IDs than the corresponding threads on the primary. The present invention maintains a mapping 233 between the <PID,TID> pairs on the primary and the corresponding pairs on the backup <B-PID, B-TID>. Detailed teachings on creation and management of said mapping is given in section 8. The interceptors, when requesting a replication message 232, provide B-P0 and B-T1 as those are its local process and thread IDs. The replication request module 230 then translates the local process and thread IDs, using the PID-TID mapping 233 into the primary <PID,TID> and uses said primary <PID,TID> in the process and thread ID comparisons described. If the replication message at the top of the list 228 has a <PID,TID> that matches the translated <B-T0,B-T1> there is a match and test is successful.

If the METHOD_ID provided by the calling interceptor 232 is different from METHOD_NONE, special processing is required. Replication messages related to process and threads have their own METHOD_IDs and are thus handled with special processing. By way of example, to retrieve the replication message for PROCESS_CREATE, the calling interceptor supplies parameters of PROCESS_CREATE, B-P1,B-T1,B-P0, where B-P1 is the newly created process with initial thread of B-T1, and B-P0 is its parent process. When requesting the replication message for PROCESS_CREATE only the parent process B-P0 is already mapped in the translations 233. For an incoming PROCESS_CREATE message with parent process P0, the corresponding B-P0 can be found in the mappings 233 as the process previously was mapped. If a process ID match is found for the parent processes, the "new process" <P1,T1> pair from the replication message is mapped against the <B-P1,B-T1> pair supplied in the interceptor and added to the mappings 233 and the test is successful.

Similarly teachings apply for THREAD_CREATE, where the parent's thread ID and the process ID are the two known quantities. Creation and maintenance of the mappings 233 is explained in further detail in section 8.

If both tests are satisfied, the top replication message is removed from the list and returned 234 to the calling interceptor and the last sequence number 236 updated to the sequence number of the just-returned message 234.

The combined use of sequence numbers, which ensure that only the oldest message is delivered, combined with the full calling context of P0 and T1 enable the Replication Request Module 230 to only return replication messages that are designated for the particular thread and process. If a thread requests a replication message and the particular message isn't at the top of the list, the thread is placed in a "pending threads callback" queue 231. As soon as the requested message is available at the top of the message list 228, the thread is removed from the "pending threads callback" queue 231 and the call is returned 234. The mechanism of pausing threads where the replication messages are not available or at the top of the message list 228 is what enables the present invention to enforce replica consistency on the backup even when processes and threads are scheduled differently on the backup than they were on the primary.

Further teachings on the use of replication messages by the interceptors on the backups, and the access methods are disclosed next

8. PROCESSING REPLICATION MESSAGES ON THE BACKUP

The backup is launched and interceptors are installed in init( ) as disclosed above for the primary. On the backup, however, init does not immediately call main( ) rather it requests and waits for the PROCESS_INIT message from the primary before proceeding. Where the primary runs un-impeded and sends replication messages when accessing resources, the backup conversely stops immediately upon entering a resource interceptor and retrieves the replication message corresponding to the particular event before proceeding.

Generally, operating systems assign different process IDs, thread IDs, resource handles etc. each time an application is run. There is thus no guarantee that a particular application always gets the same process ID. This means that the initial process on the primary and the initial process on the backup may have different process IDs. Likewise for all other resources. To correctly map replication messages from the primary to interceptors on the backups a mapping of between process and thread IDs on the primary and backup is created.

As the initial process is created and just prior to calling main, an replication message <PROCESS_INIT, S0, P0, T0> is created and sent to the backup. On the backup, the messaging engine receives the PROCESS_INIT message. Referring to FIG. 6 for illustrative purposes: When the interceptor on the backup requests 232 the PROCESS_INIT it supplies its process and thread IDs (B-P0, B-T0). The replication request module 230 is thus able to match the <P0,T0> pair with <B-P0,B-T0> and creates an entry in the PID-TID mapping 233. Likewise, when a PROCESS_CREATE or THREAD_CREATE message is at the top of the sorted message list 228, the replication request module 230 creates a mapping between the newly created process's and/or thread's primary and backup IDs. When a process or thread terminates and sends PROCESS_EXIT or THREAD_EXIT, the replication request module 230 similarly removes the related entry from the PID-TID mappings upon receiving the request 232 from the interceptor. The Replication Request module 230 thus dynamically maintains mappings between <PID,TID> pairs on the primary and the corresponding <B-PID,B-TID> on the backup.

In the preferred embodiment the messaging engine maintains the process and thread ID mappings. In an alternate embodiment the interceptors maintain the mappings In the preferred embodiment, the mapping between processes and threads on the primary <Pi,Ti> and their counterparts on the backups <B-Pi, B-Ti> are maintained using a hash table, with the <Pi,Ti> pair being the key and the pair <B-Pi,B-Ti> being the corresponding process/thread on the backup. In an alternate embodiment a database is used to maintain the mappings.

Figure 7:
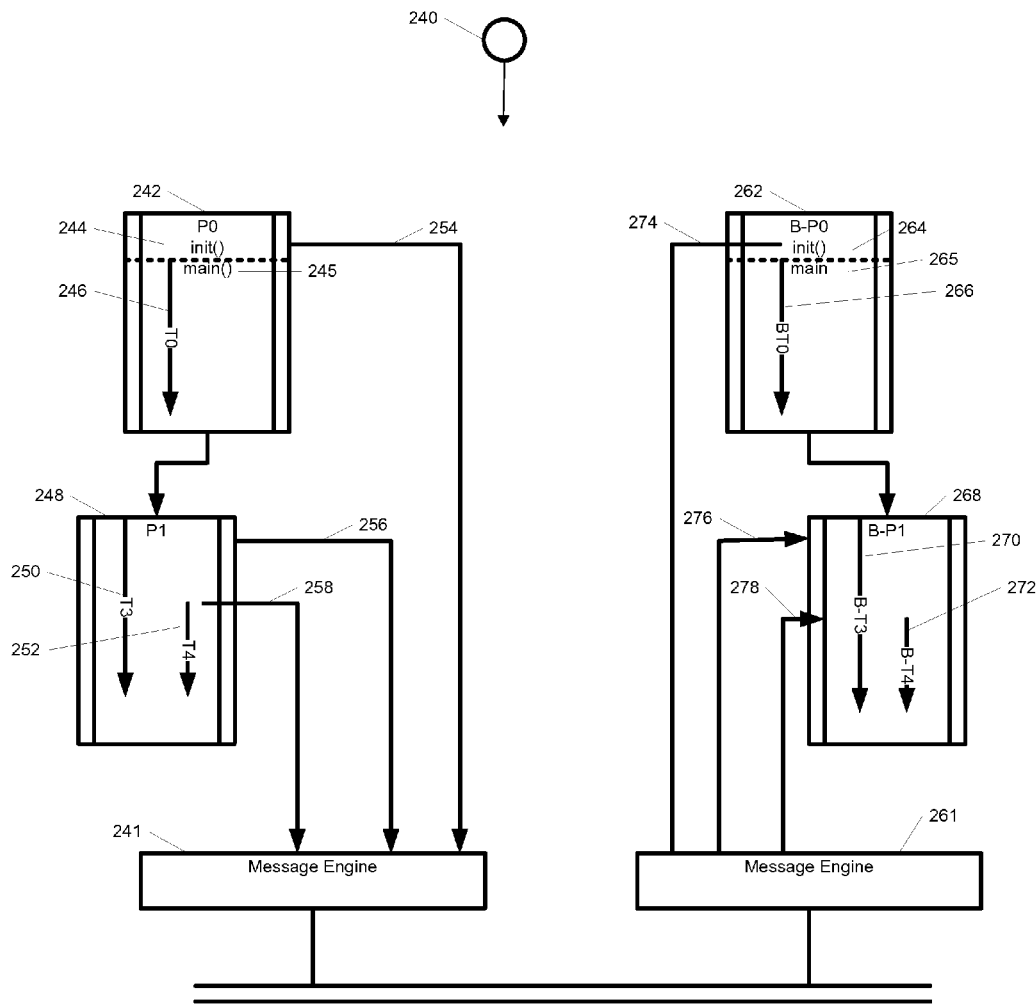

FIG. 7 illustrates by way of example embodiment 240 an application starting as one process P0 242. The application starts and gets to init 244 where interceptors are installed. Before calling main 245 the replication message 254 <PROCESS_INIT S0, P0,T0> is created and sent to the Message engine 241. The initial process P0 contains one thread T0 246. At some point during execution a second process P1 248 is created. A replication message 256 <PROCESS_CREATE, S1,P1,T3,P0> is created designating the process, the initial thread T3 250, and the parent process P0. Said message is transmitted via the Messaging Engine 241. A second thread T4 252 is later created within the process P1. The corresponding replication message <THREAD_CREATE,S2,P1,T4,T3> is created 258 and transmitted via the message engine 241.

On the backup incoming replication messages are sorted by sequence number, and the process and thread ID mappings are created as previously disclosed The list of replication messages are

| PROCESS_INIT | S0, P0, T0, P0 |
| PROCESS_CREATE, | S1, P1, T3, P0 |
| THREAD_CREATE, | S2, P1, T4, T3 |

On the backup, the application is started 262 and gets to init 264 where interceptors are installed. Where the primary sends out the PROCESS_INIT message prior to calling main( ) the backup instead requests the PROCESS_INIT message from the message engine 261. The message engine, delivers the message 274 <PROCESS_INIT S0, P0,T0,P0> to init 264. The PROCESS_INIT replication message allows the backup messaging engine to map its process ID of B-P0 to P0 and B-T0 to primary thread ID T0. Henceforth, whenever a replication message with process ID of P0 is received, the backup maps it to the process with ID B-P0. Likewise replication messages with thread ID of T0 are mapped to B-T0 on the backup. The backup proceeds to main 265 and begins to execute. Later during the single-threaded execution of B-P0 a second process B-P1 is created. The "process create" is intercepted as part of the interceptors for processes and threads. After creating the process B-P1 268 and the initial thread B-T3 270 the message engine is called again. The request is for a <PROCESS_CREATE> message 276 with parent process P0. At the top of the list is <PROCESS_CREATE,S1,P1, T3,P0> which is the correct message, and its returned to the calling interceptor. The messaging engine can now map P1 to B-P1 and T3 to B-T3. Later during the execution of thread B-T3 a thread_create( ) is encountered. The thread is created and a THREAD_CREATE message is requested with process ID P1 and thread ID P3. At the top of the list is <THREAD_CREATE, S2,P1,T4> which is the correct message and its returned 278 to the interceptor. The messaging engine can now map thread ID T4 to B-T4 on the backup.

Figure 8:
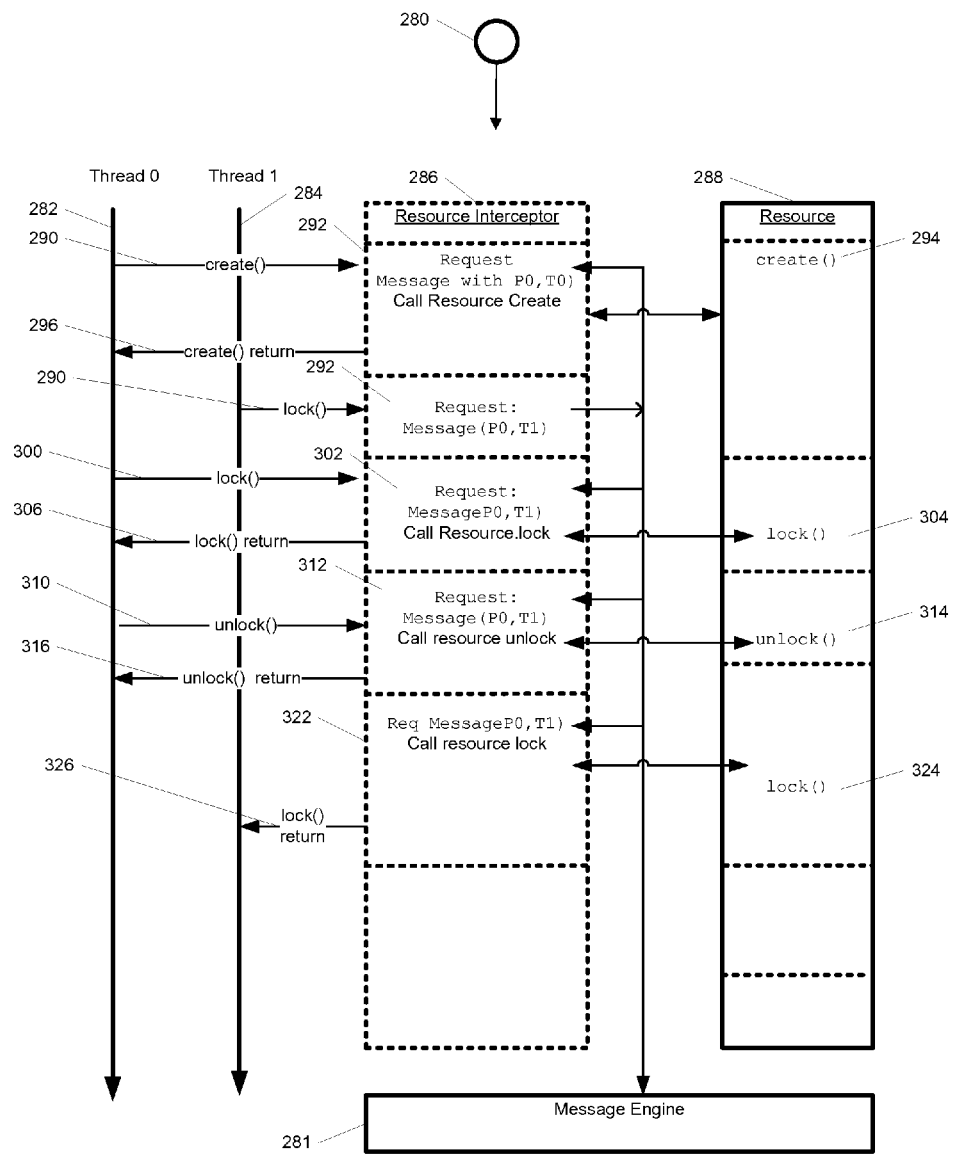

FIG. 8 illustrates by way of example embodiment 280, processing of the replication messages on the backup generated by the embodiment of the primary shown on FIG. 4. The replication messages generated by the primary were disclosed above as:

| METHOD_NONE, S0, P, T0 | // new Lock( ), Thread 0 |
| METHOD_NONE, S1, P, T0 | // lock( ), Thread 0 |
| METHOD_NONE, S2, P, T0 | // unlock( ), Thread 0 |
| METHOD_NONE, S3, P, T1 | // lock( ), Thread 1 |

The following assumes that the process and thread mappings have been established as taught above and mapping thus exists between threads and processes on the primary and the backup. Thread-0 282 is the thread on the backup corresponding to thread-0 FIG. 4—142 while Thread-1 284 is the thread on the backup corresponding to thread-1 FIG. 4—144. The interceptor for Lock 286 was installed during init( ) and the Lock resource is 288.

Initially, Thread-0 282 calls create( ) 290 to create the resource. The call is intercepted 292. The interceptor requests the replication message for process P and Thread T0. The message with matching <PID,TID> is at the top of the message list in the messaging engine 281 and is returned to the interceptor. The interceptor proceeds to call the resource create( ) 294 and returns the resource to the calling thread 0 296.

By way of example, on the backup thread 2 284 is scheduled to run and thread 2 request the lock( ) 290 prior to thread 1 requesting the lock as were the case illustrated on FIG. 4. The call is intercepted 292 and the message for process P and thread T1 is requested. This message with matching <PID, TID> is not at the top of the list in the messaging engine 281 and thread T1 284 thus is blocked and put on the Pending Threads Callback list and the call not returned to the interceptor.

Thread 0 282 is then scheduled and requests a lock( ) 300 on the resource. The call is intercepted 302, and the message for process P and thread T0 is requested. The is the message with matching <PID,TID> is at the top of the message list 281 and is thus returned to the calling interceptor 302. The interceptor calls lock( ) in the resource 304 and returns the lock to the called 306. After using the lock'ed objected unlock 310 is called an intercepted 312. The replication message with matching <PID,TID> for process P and thread T0 is requested and returned as it's at the top of the message list 381. The interceptor 312 calls the resource unlock( ) and the resource is unlocked.

Upon delivering the replication message corresponding to unlock( ) 310 for Thread 0 to the interceptor 312 the earlier request from thread 1 284 containing <P,T1> is now at the top of the list in the messaging engine 281. The message is therefore returned to the interceptor 322 and lock( ) is called in the resource 324. If Thread 1 282 has not yet called unlock( ) 314 the resource lock 324 blocks until the resource is unlocked by thread 0 282. If thread 0 has unlocked the resource 316 the resource lock 324 would immediately succeed and return the interceptor 322. The lock is then returned 326 to the calling thread.

The present invention thus ensures that the lock ordering from the primary is enforced on the backup, even if the backup requests locks in a different order. It is readily apparent to anyone skilled in the art that the teachings extends to multiple locks, processes, threads and objects and that the teachings thus ensures replica consistency between the primary and backup.

9. I/O RESOURCE METHODS

The teachings so far have focused on processes, threads and locks. I/O Resource methods may write data to locations outside the application proper. By way of example, the locations can be files on disk, locations in memory belong to the operating system or system libraries, or locations addressable over a network. The data written with writing methods persists beyond the write operation: data is stored in files, the seed for a random number generator affects future random( ) calls, and data written to a socket is received by the another application.

9.1 I/O Resources—Writing Data

Write operations generally cannot be repeated. By way of example, if data is appended to a file (a write operation) appending the data a second time produces a different file larger file with the data appended twice. This present invention addresses this issue by ensuring that the backup, by way of continued example, doesn't append the data to the file even though the primary performed an append write operation. Write operations on the backup are suppressed, i.e. the interceptors capture the results from the primary application and use those on the backup instead of performing the actual write. This aspect of the present invention is explained in further detailed below.

The primary application run unimpeded and performs all write operations. The replication messages corresponding to write operations are similar to the ones used for locks. However, write operations may have return values indicating, by way of example, the number of bytes written, and may modify some of the parameters passed to the method of the write operation. This additional information is also packed into replication messages and sent to the backup using the DATA field in the replication messages

```
int main (void)
{
  char const *pStr="small text";
  FILE *fp=fopen("/home/user/newfile.txt", "w")
  if (fp !=null)
     fwrite (pStr,1, strlen(pStr),fp);
  fclose (fp);
}
```

By way of example, the replication messages corresponding to the above example are:

| | |
|---|---|
| METHOD_NONE, S0, P, T0, | {DATA, len1, data1} //fopen( ) |
| METHOD_NONE, S1, P, T0, | {DATA, len2, data2} //fwrite( ) |
| METHOD_NONE, S2, P, T0, | {DATA, len3, data3} //fclose( ) |

Many write operations, such as by way of example, fwrite on a FILE opened with 'w' are exclusive and behave like Locks: Only one thread can write to a particular file at any one time. The locking behavior is thus automatically handled, as the replication messages enforce the order of execution as it takes place on the primary, and thus forces the backup through the same locking steps in the same order.

The DATA block {DATA, len1, data1} attached to the fopen( ) replication message contains the return value of the fopen( ) call, which is the file handle. The file handle (a pointer) from the primary is of no direct use on the backup, as the backup generally creates a different file handle. The contents of the FILE handle, however, contains important internal FILE state data such as current directory, time stamps of last access, and error conditions. The FILE handle is therefore sent to the backup so the backup can extract said internal state and set the FILE handle state on the backup to the values from the primary. By way of example, if fopen( ) fails on the primary, it is forced to fail on the backup, if fopen( ) succeeds on the primary, it should succeed on the backup.

The DATA block {DATA, len2, data2} attached to the fwrite( ) replication message contains the size t object with the number of objects successfully written and the FILE pointer. The count is sent to the backup in order for the backup to return the same return value as the primary and the FILE pointer is sent so that the backup can update its local FILE point to have the same internal state.

For every I/O operation that writes data the return value is encoded and transmitted in the DATA block along with the parameters. The encoding can be as simple as an ASCII representation of the data. As long as primary and backup agree on encoding any encoding can be used. In the preferred embodiment the data is encoded using XML and MIME. In an alternate embodiment a custom encoding is used.

The actual data written is not transmitted via a replication message. The replica already has a full running copy of the application and it can generate the data itself if need be.

Write operations on the backup are handled much like the previous teachings with one major exception. The actual write operation is suppressed, i.e. skipped, on the backup as it generally is not valid to repeat a write operation. The results produced on the primary are "played back" on the backup. The state is adjusted based on the primary's state as necessary.

Figure 9:
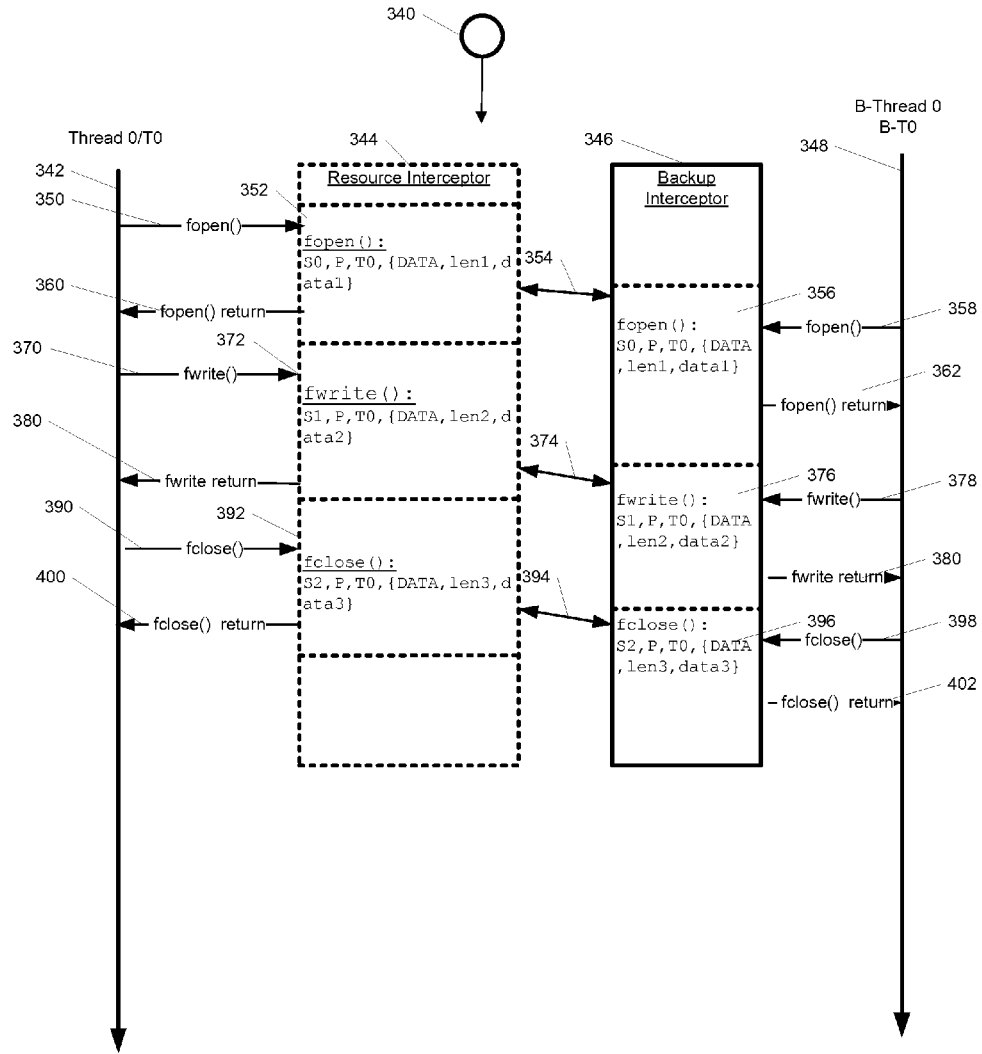

FIG. 9 illustrates by way of example embodiment 340 the above outlined example of opening a file for writing, writing a string to the file, then closing the file. For clarify of presentation, the Message Engine is not shown on the diagram. FIG. 9 shows replication messages going directly from the interceptor on the primary 344 to the interceptor on the backup 346. It is however assumed that messages go through the messaging engine, are sorted by sequence number and delivered to the interceptors on the backup as previously disclosed. Similarly, the actual I/O resource is not shown on the diagram. The resource is responsible for writing similarly to the resource on FIG. 8—288 as previously disclosed.

Referring to FIG. 9, the primary application consists of one thread T0 342 with the interceptor 344. The backup application likewise consists of one thread B-T0 348 and the resource interceptor 346. The primary application is launched as is the backup application.

The primary thread calls fopen( ) and is intercepted 352. The fopen( ) call is processed by the I/O resource (not shown as explained above) and the return value from fopen is packaged into the DATA block and the replication message METHOD_NONE, S0, P, T0, {DATA, len, data1} is sent 354 to the backup interceptor 346 via the messaging engine. This is followed by fopen( ) returning 360 to the calling thread 342. On the backup the main thread B-T0 is processing and reaches fopen( ) 358, which is intercepted 356. The interceptor requests the replication message with <P, T0> and is delivered the matching message S0, P, T0, {DATA, len, data1}. As disclosed previously, the backup doesn't open the file, rather it uses the data in the DATA block to determine the actual return value of fopen( ) and to set the internal state of the FILE object. This is followed by returning 362 the return value to the calling thread 348. The backup application thus operates under the assumption that it has opened the file, even though it has only been presented with the results from the primary.

Later the primary thread 342 calls fwrite( ) 370 which is intercepted 372. The write operation is completed using the I/O resource and the results packed into the DATA block of the replication message METHOD_NONE, S1, P, T0, {DATA, len2, data2}. The replication message is sent 374 via the messaging engine and eventually retrieved by the interceptor on the backup 376. In the meantime the backup thread is executing and reaches the fwrite( ) 378 call, which is intercepted 376. The interceptor requests the replication message corresponding to <P,T0> and is delivered the above mentioned message when available. The data in the DATA block of the replication message is used to set the return value of fwrite( ) 380, and to set the internal state of the FILE pointer; no actual write takes place. Upon returning to the main thread in the backup 348 the program continues under the assumption that a file has been written, even though no writing took place on the backup.

Finally, the thread T0 342 calls fclose( ) 390, which is intercepted 392. The close operation is completed using the I/O resource and the result packed into the DATA block of the replication message METHOD_NONE, S2, P, T0, {DATA, len3, data3}. The replication message is sent 394 via the messaging engine and eventually retrieved by the interceptor 396 on the backup. This is followed by fclose( ) returning 400 to the calling thread. In the meantime the backup thread continues executing and calls fclose( ) 398, which is intercepted 396. The interceptor request the replication message corresponding to <P,T0> and uses the data in the data block to set the return value and internal state of the FILE object. Said return value is returned via fclose( )'s return 402.

9.2 I/O Resources—Reading Data

For Read operations the same general technique is used. The primary application is responsible for all reading operations, while the backup receives a DATA block indicating the read operation results. For read operations the DATA block additionally contains the actual data read. The data is encoded along with return values and parameters using the preferred embodiment disclosed above. As with write-operations, and alternate embodiment with custom encoding is also considered.

```
int main (void)
{
  int length=10;
  char pStr[length];
  int count=0;
  FILE *fp=fopen("/home/user/newfile.txt", "r")
  if (fp !=null)
      count=fread(pStr,1, length,fp);
  fclose (fp)
}
```

By way of example, which reads 10 (length) characters from a file generates the following replication messages

| METHOD_NONE, S0, P, T0, | {DATA, len1, data1} // fopen( ) |
| METHOD_NONE, S1, P, T0, | {DATA, len2, data2} // fread( ) |
| METHOD_NONE, S2, P, T0, | {DATA, len3, data3} // fclose( ) |

The DATA block for fread( ) is the only one which is substantively different from the previous fwrite( ). For fread( ) the DATA block encodes the return value (count), the parameter (fp) and the content of buffer read (pStr).

Upon retrieving the fread( ) replication message the interceptor for fread( ) on the backup updates the return value (count), updates the state of the local FILE object and copies the pStr from the DATA block into the pStr on the backup. The interceptor then returns the fread( ) to the calling thread. On the backup no data is read, rather the original fread( ) is intercepted and suppressed, and the data read by the primary is supplied to the interceptor which uses it in-lieu of reading the data.

While in some cases it would be possible to let the backup actually read the data directly and not pass it via replication messages that is not always the case. Some storage devices only allow one access at any one time, some storage device might be mounted for single user access, or the read operation might actually be from a location in primary local memory not accessible by the backup.

Similarly, for network read operations using, by way of example, sockets it's only possible to read/receive any particular message once. The backup does not have the ability to also read the incoming message.

Thus, in the preferred implementation, data read is passed via replication messages to the backup. In an alternate implementation, the backup reads the data wherever possible.

9.3 I/O Resources—Other

For read and write operations that affect system libraries similar teachings apply. By way of example, srand (unsigned int seed) initializes a random number generator with a chosen seed value. This is equivalent to a write operation to "a library memory location" and the corresponding replication message METHOD_NONE, S0, P0, T0, {DATA, len1, data1} has the seed value encoded within the DATA block. The seed value is thus passed to the backup.

By way of example, "double rand ( )", which generates a random number is similar to a read( ) operation in that it produces a number from the system library. The corresponding replication message is again METHOD_NONE, S0, P0, T0, {DATA, len2, data2}. The random number is encoded as the return value and passed via a replication message to the backup. When the backup program executes the rand( ) method call, it is presented with the value of rand( ) produced on the primary, and is not generating its own.

The general teachings are thus: for write operations the writes are performed on the primary and the results and parameters are sent to the backup using replication messages. For read operations the reads are performed on the primary and the results, parameters and data-read are sent to the backup using replication messages.

10. RELIABLE NON-BLOCKING MESSAGING PROTOCOL

One of the key characteristics of the present invention's replication strategy is that the primary runs at full speed without waiting for the backups. The backups process incoming replication messages and use those to maintain replica consistency with the primary. While the backups are running behind in time, the replication strategy guarantees that they will produce the same results in the same order as the primary.

TCP is optimized for accurate delivery rather than timely delivery. It's therefore common for TCP to pause for several seconds waiting for retransmissions and out-of-order message. For real-time operations, such as replication, TCP is thus not always an ideal choice. TCP is "point to point' meaning that a TCP connection is between two predefined endpoints.

UDP is optimized for timely delivery rather than accurate delivery. UDP may deliver message out of order, or not at all and thus requires additional layers of software in order to be used for reliable messaging. UDP can operate point to point but also offers broadcast, where a packet goes to all devices on a particular subnet, and multicast, where each packet is sent only once and the nodes in the network replicate and forward the message as necessary. Multicast is well known in the art and is thus not further described here.

The combined use of UDP and multicast enables real-time delivery of messages to one or more subscribers, even though the originator of the multicast message (the primary in this case) sends only one message. The non-blocking nature of UDP combined with multicast it thus an ideal mechanism to distribute replication messages from a primary to one or more backups and is used in the preferred embodiment of the present invention. An alternate embodiment uses TCP and transmits each replication message to all backups over TCP.

10.1 Reliable Ordered Delivery Over UDP

Using UDP as underlying transport means that the communication protocol must ensure ordered delivery of all messages. There are two parts to ordered delivery: guaranteeing delivery and ordering. To ensure delivery, a copy of each message sent by the primary is placed in a "Pending ACK Queue" (PAQ) until receipt of the message has been confirmed.

Figure 11:
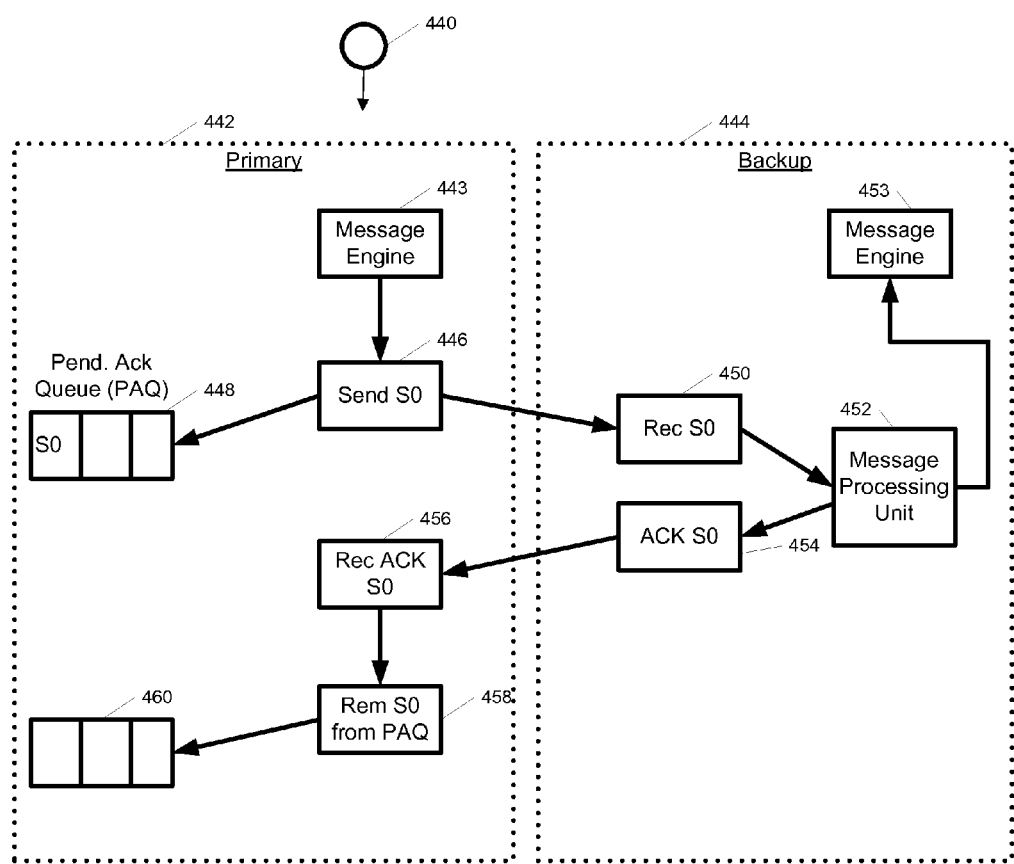
FIG. 11 is a block diagram illustrating sending one replication message

FIG. 11 illustrates by way of example embodiment 440, sending one message, sending and receiving ACK messages, and management of the PAQ. In the following we identify a replication message with its sequence number, i.e. a replication message with sequence number S0, is called S0. On the primary 442 the message engine 443 has a replication message with sequence number S0 to be sent 446. Prior to sending S0, a copy of the message (S0) is placed in the PAQ indicating that it's intended for the backup, but receipt has not been acknowledged by the backup yet. The message S0 is sent to the backup 444, where it's received 450. The message S0 is handed off to the Message Processing Unit (MPU) 452 (disclosed in detail later) and the message acknowledged (ACK) 454 to the primary 456. The MPU then delivers the message to the Message Engine 453 on the backup. On the primary, receiving the ACK for S0 indicates that S0 can be removed 458 from the PAQ 460, which thereafter no longer contains S0.

The Message Processing Unit (MPU) 452 on the backup is responsible for sorting incoming replication messages by sequence number, acknowledge receipt of replication messages, and to request missing replication messages. The operation of the MPU is disclosed in section 10.3 below.

Figure 12:
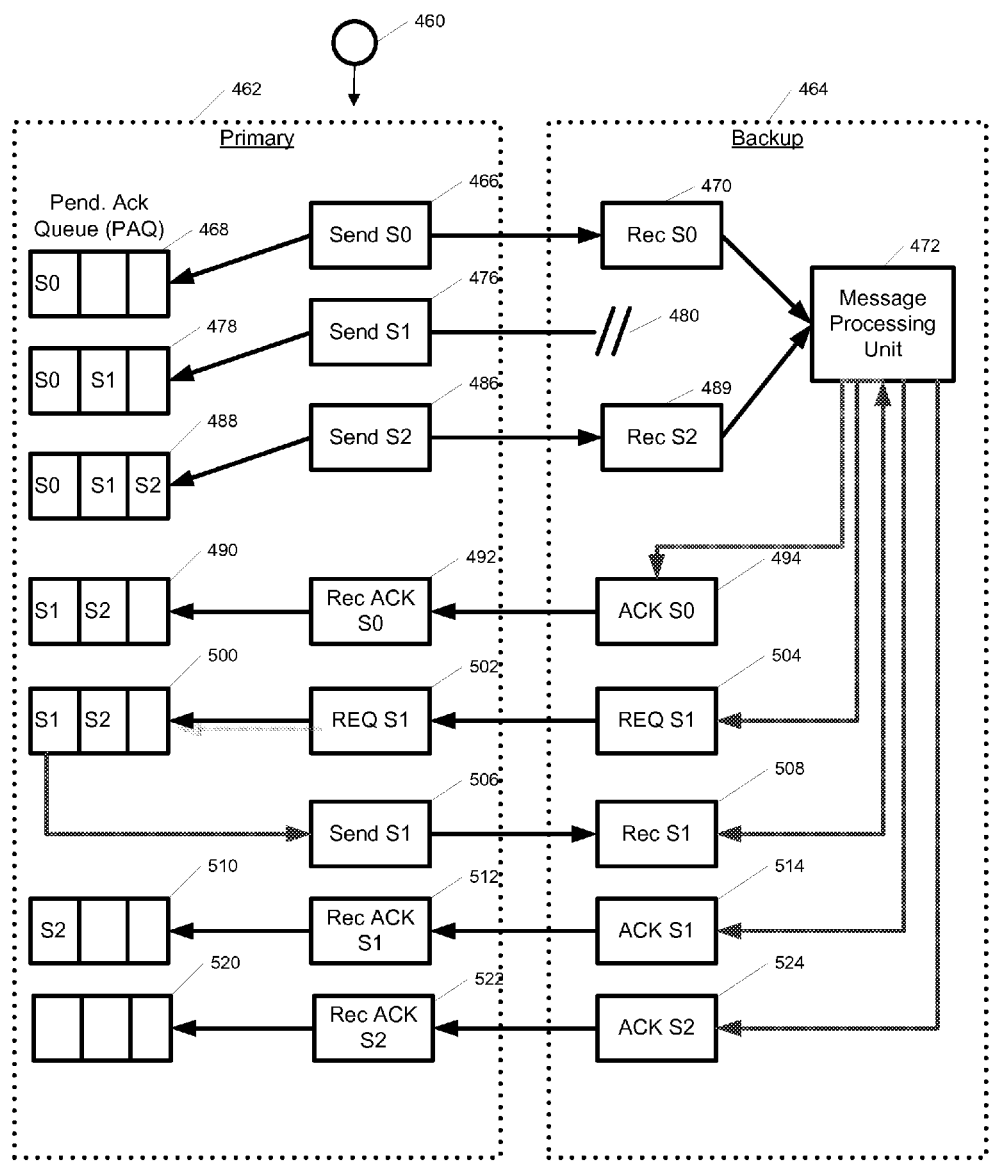
FIG. 12 is a block diagram illustrating multiple messages with retransmit

FIG. 12 illustrates by way of example embodiment 460, sending multiple messages from a primary 462 to a backup 464, with delivered messages, lost messages and retransmitted messages. From now on the Message Engine is no longer depicted on the diagrams; it is understood that the local message engine delivers messages on the primary and is the recipient on the backup. Prior to sending message S0 466 a copy is of S0 is placed in the PAQ 468 and the message is sent. Prior to sending message S1 476 a copy of S1 is added to the PAQ 478, and prior to sending message S2 486 a copy is added to the PAQ 488. After sending S0, S1 and S2 the PAQ thus contains a copy of all three messages sent. On the backup 464, message S0 is received 470, message S1 is not received 480, while message S2 is received 489. With UDP there is no guarantee that S0, S1 and S2 arrive in the same order they were sent, but for clarity of presentation we assume that S0 was received before S2. The teachings are extended later to handle out-of-order receipt of messages.

Received message S0 470 is forwarded to the MPU 472. The MPU acknowledges receipt of message S0 by sending an ACK S0 494 back to the primary. The ACK S0 is received 492 and S0 is removed from the PAQ 490. Received message S2 489 is forwarded to the MPU 472. The MPU detects that S2's sequence number is more than 1 higher than S0's sequence number and a message thus is missing. The MPU 472 therefore requests a retransmit of S1 by sending a REQ S1 504 to the primary. The REQ S1 502 is received and S1 is retrieved from the PAQ 500, and retransmitted 506 to the backup. This time S1 is received on the backup 508 and forwarded to the MPU 472. The MPU acknowledges receipt of S1 by sending an ACK S1 514 to the primary. The ACK S1 is received 512 and S1 is removed from the PAQ 510. With S2 being the next messages after S1, the MPU 472 acknowledges receipt of S2 by sending an ACK S2 524 to the primary. The ACK S2 is received by the primary 522 and S2 is removed from the PAQ 520. At this point all messages sent by the primary have been received by the MPU 472 and all have been acknowledged and removed from the PAQ 520.

10.2 Out of Order Processing of ACK and REQ

In the just disclosed example embodiment 460 on FIG. 11, the backup acknowledges, i.e. sends ACK messages, following the strict ordering imposed by the sequence numbers S0, S1 and S2. This is not necessary and was done to better illustrate the flow of messages. The backup can issue ACK messages for a received message as soon as it has been received by the MPU. The teachings above are adapted to out of order ACK as follows: After receiving S0 470 the MPU issues ACK S0 494. This is followed by the receipt of S2 489 and the MPU issues the ACK 524. At the time the MPU receives message S2 the MPU detects the absence of message S1, and therefore issues a REQ S1 504 to request re-transmission of S1.

The primary would first receive ACK S0 492 and update the PAQ 490 to contain S1 and S2. This would be followed by receipt of ACK S2 522 and updating of the PAQ 520 to contain S1. S1 is now the only message that has not been ACK'ed by the backup. This followed by the receipt of REQ S1, which triggers a re-transmission of message S1 506 to the backup. The backup receives S1 508, and the MPU 472 issues the ACK for S1. The primary receives the ACK for S1 and removes S1 from the PAQ. The purpose of the PAQ is to preserve a copy of replication messages not yet acknowledged by the backup. The ordering in which the ACKs are received is therefore not important.

The preferred implementation ACK's messages in the order in which they arrive at the backup, and does not impose the implied message ordering from the primary.

10.3 Message Processing Unit (MPU)

The MPU is responsible for receiving replication messages, sorting incoming replication messages by sequence number, sending ACK messages to the primary, requesting retransmission of missing messages, and for delivering the replication messages to the messaging engine in the right order.

Figure 13:
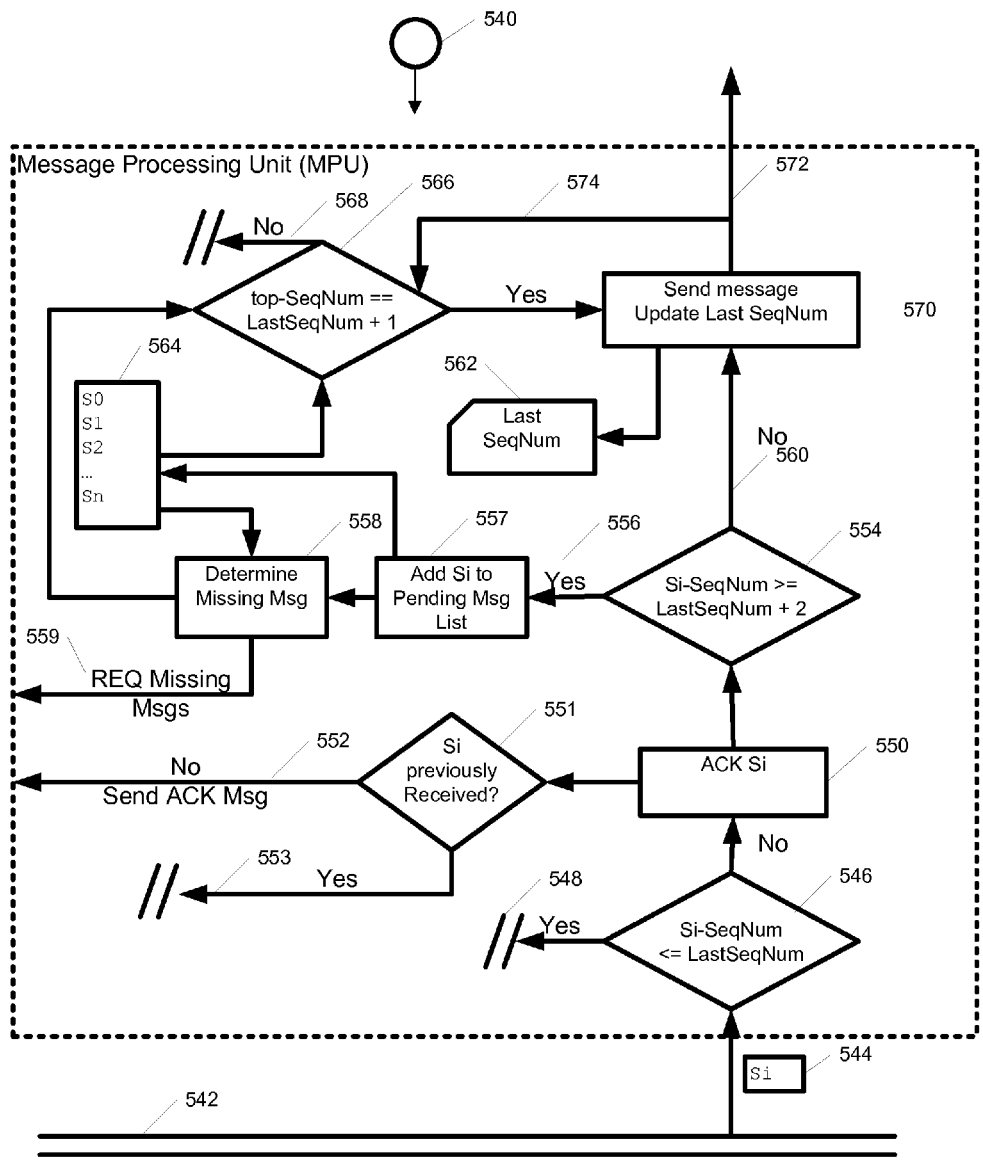
FIG. 13 is a block diagram illustrating the Message Processing Unit

FIG. 13 illustrates by way of example embodiment 540 the MPU and its functional components. An incoming message Si 544 arrives over the transport 542. First test 546 is to see if this is an older message, i.e. a replication message with a sequence number less than the current 'lastSeqNum' 562. The sequence number of the most recently transmitted messages (LastSeqNum) is used to ensure that messages are delivered to the local messaging engine in the right order and with sequence numbers increasing by one every time. If the Si is less than LastSeqNum it means the message was previously received, and this message can be discarded 548. If Si>LastSeqNum in the first test 546 the message is newer and it needs to be determined if an ACK should be generated for Si. With messages arriving out of order Si could be a message previously received and already ACK'ed. To determine 551 if Si has been previously received the pending message list 564 is searched for Si. If Si is found in the list, Si was previously received and already ACK'ed and no further action is needed 553. If Si is not found in the pending messages list 564 Si is a new message and an ACK is sent 552. In alternate embodiments the functionality of the pending message list 564 is implemented as a queue, hashmap or database.

The second test 554 determines if Si is the next replication message to be sent. If Si>=LastSeqNum+2 it means that Si is at least one message further along in the message stream that the current last message 556. Si is added 557 to the pending messages list 564, if not already in the list, and it is determined which messages are missing. Messages with sequence number between (LastSeqNum+1) and (Si−1) are possible missing messages. If a sequence number is missing from the pending message list the corresponding message is missing, and is requested 559 with a REQ message to the primary.

In pseudo code, where 'sn' represents possible messaging messages:

for(int sn=LastSeqNum+1; sn<=Si−1;sn++)
{
    if (sn is not in pending message list)
    Send REQ for sn
}

After sending REQ messages it is determined if the pending message list now contains the next message to be sent. The third test 566 determines if the sequence number of the top message in the pending message list 564 is one larger than LastSeqNum, which means that the top message in the message list 564 is next message to be sent. If it is, the message is removed from the list 564, sent 572 and the LastSeqNum 562 is updated 570. If the sequence number of the top message in the message list 564 is more than one larger than LastSeqNum no action is taken 568. After sending the message 570 the third test 566 is run again 574 until there is no top message in the message list 564 with a sequence number one larger than the LastSeqNum. This ensures that all messages are delivered to the local messaging engine as soon as they are available 10.4 Multiple Backups In the case of multiple backups, there are three different scenarios to consider for each replication message: 1) the message is received by all backups and the corresponding ACKs are returned, 2) the message is not received by any backups and backups issue the corresponding REQ at some point, or 3) some backups receive the message and issue an ACK, while other backups don't receive the message and issue REQ.

The teachings in section 10.3 disclose how the MPU on each backup ensures that only one ACK is issued for a received message and how missing messages are REQ'ed until received.

Figure 14:
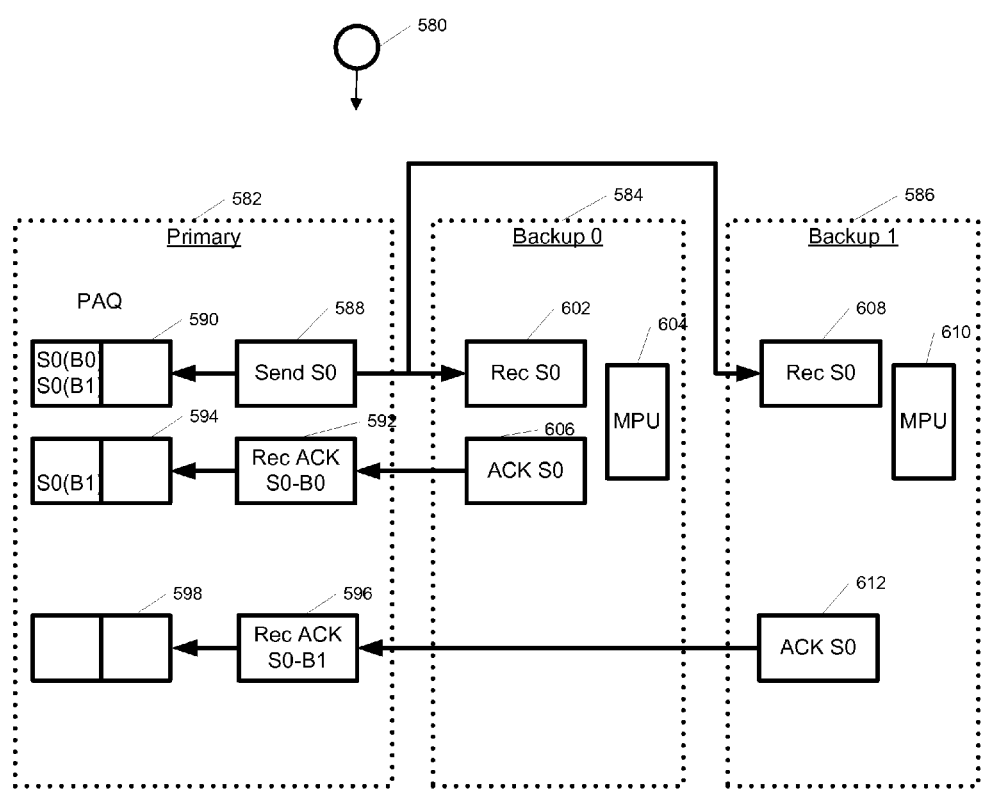
FIG. 14 is a block diagram illustrating multiple backups

The teachings in section 10.1 and 10.2 are augmented in the following way to ensure accurate tracking of ACKs for the individual backups. The previous teachings disclosed one element in the PAQ for each replication message corresponding to the one backup in the example embodiments. In the case of two or more backups there are correspondingly two or more entries in the PAQ for each replication message. The PAQ entries are each assigned to one backup, so that, by way of example, if there are two backups, replication message S0 is repeated twice in the PAQ FIG. 14 illustrates by way of example embodiment 580 the PAQ operation in an example embodiment with two backups. The primary 582 sends replication messages to two backups, backup-0 584 and backup-1 586. Prior to sending message S0 588, a copy for each backup is placed in the PAQ 590. S0(B0) is the copy of S0 corresponding to backup-0 584, and S0(B1) is the copy of S0 corresponding to backup-1 586. The message is received on backup 0 602, and the MPU 604 issues the ACK S0 606 as previously disclosed. On the primary, the ACK-S0 from backup-0 584 is received 592 and the corresponding copy S0(B0) is removed 594 from the PAQ. Likewise, S0 is received on backup-1 608, and the MPU 610 issues an ACK S0 612. On the primary the ACK S0 from backup-1 is received 596 and S0(B1) is removed from the PAQ 598. The PAQ at all times contains those messages sent to backups where no ACK has been received.

If one or more of the backups issue a REQ for a particular message, the corresponding replication message is retransmitted per the teachings above. If, by way of example, backup-1 issued a REQ S0, the primary would retrieve S0(B1), which was still in the PAQ, and retransmit. Both backup-0 584 and backup-1 586 could thus receive S0 based on the backup-1 requesting a S0. On backup-0 the second copy of S0 is automatically rejected as illustrated in FIG. 13 Step 546 and disclosed previously.

It is thus obvious to anyone with ordinary skills in the art, that the above disclosures support one or more backups.

10.5 Non-Blocking Processing on the Primary

A key aspect of the present invention's replication strategy is that the primary runs at full speed without waiting for the backups. As control and messages pass from the messaging engine down to the reliably messaging layer, the present invention likewise ensures that the processing in the reliable messaging layer is non-blocking as it relates to sending messages.

Figure 15:
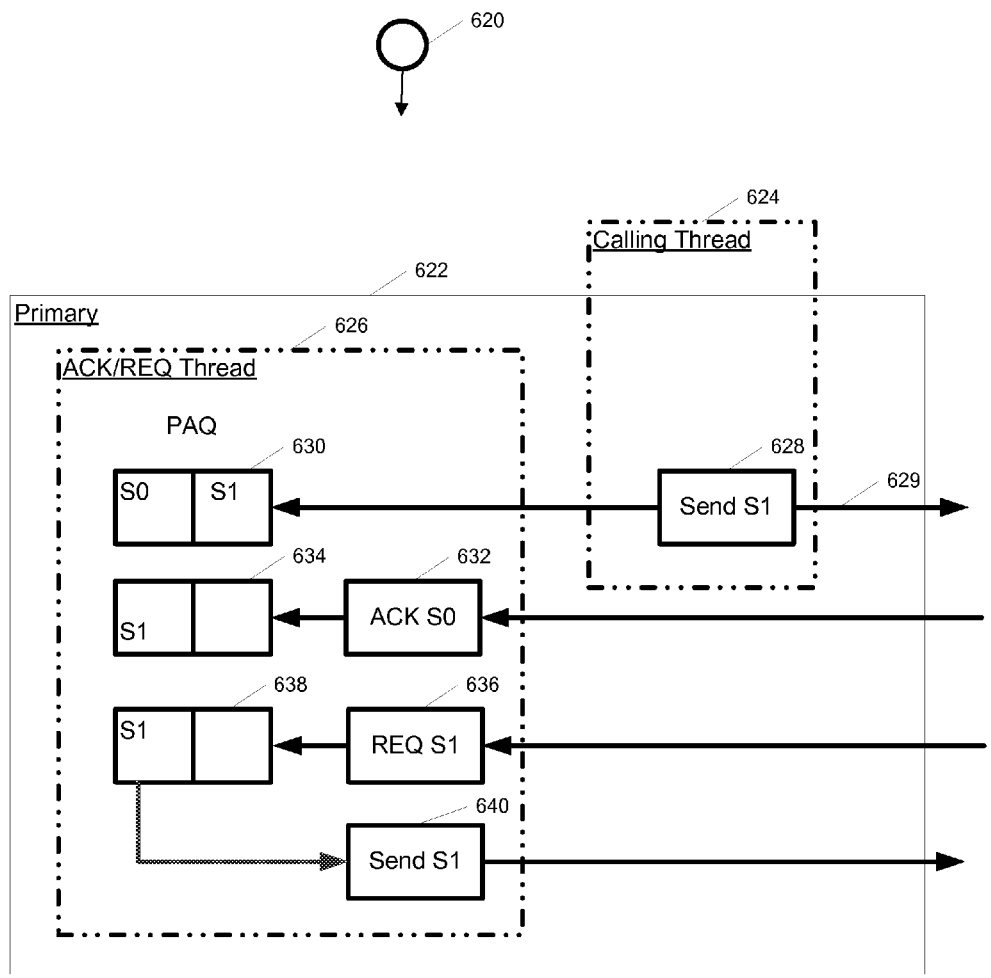
FIG. 15 is a block diagram illustrating non-blocking primary execution
Figure 16:
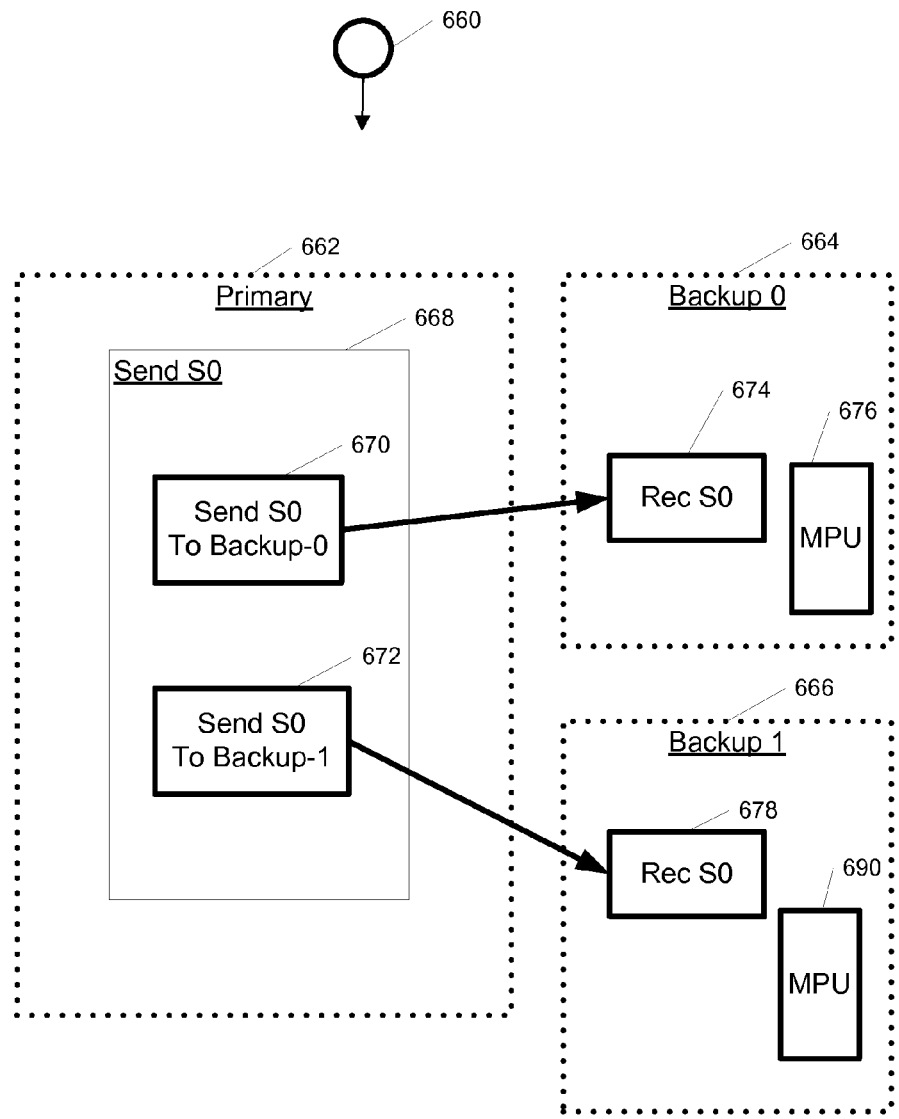
FIG. 16 is a block diagram illustrating reliable messaging over TCP.

In a preferred implementation the non-blocking of the reliably messaging engine is achieved through the use of multi-threading or multi tasking. FIG. 15 illustrates by way of example embodiment 620 the primary 622 and the two core threads in use. The reliable messaging engine is called from the message engine using the existing thread of the messaging engine 624. In the example embodiment 620 a message S0 has already been sent, and message S1 is ready for sending 628. As previously disclosed, a copy of S1 is first placed in the PAQ 630, and the message is sent 629. After sending the message, the calling thread 624 returns to the messaging engine. The messaging engine thus immediately regains full control of its thread and is not involved in resolving ACK and REQ messages that arrive later.

Separately, an ACK/REQ thread 626 processes all incoming requests. The ACK/REQ thread 626 receives an ACK S0 632 indicating that message S0 was properly received. S0 is subsequently removed from the PAQ 634. This is followed by a REQ for S1 636, which is retrieved from the PAQ 638 and retransmitted 640. All processing of ACK and REQ messages are performed on the ACK/REQ thread and therefore does not impact the execution of the core thread 624 belonging to the messaging engine. The primary thus runs unimpeded with all management of ACK and REQ being handled in the background by a dedicated ACK/REQ thread 626. The primary can thus also send messages concurrently with processing the ACK/REQ request.

10.6 Implementation over TCP

The preferred implementation disclosed above uses UDP with multicast as an efficient mechanism to deliver one message to multiple recipients. An alternate preferred implementation uses TCP with the teachings adapted as follows.

TCP is a point-to-point protocol, which in a preferred embodiment means that the replication message is sent multiple times; once to each backup. FIG. 15 illustrates by way of example embodiment 660 sending a replication message S0 668 from the primary 662 to two backups; backup-0 664 and backup-1 666. Sending the replication message S0 to the backups is a two step process with TCP: First the message is sent 670 to backup-0, and then the message is sent 672 to backup-1 666. On backup-0 the message is received 674 and delivered to the MPU 676. On backup-1 the message is received 678 and delivered to the MPU 690.

As TCP guarantees ordered delivery, replication messages arrive in the order they were sent, and there is thus no need for the ACK and REQ messages and the PAQ on the primary. The teachings above for the MPU are thus simplified over TCP as there is no tracking to be done and all messages therefore are delivered directly to the messaging engine without need for further processing. The simplification at the backups come at the cost of the primary, where the primary now needs to generate as many networks transactions per replication message as there are backups. This doubling, tripling etc of the number of network packets has exponentially negative effect on network throughput and latency. Sending multiple replication messages instead of one, also takes additional CPU which reduces overall throughput on the primary.

10.6 One-to-One and WAN Considerations

As disclosed in section 10.5 for scenarios with only one backup, TCP simplifies the MPU functionality and eliminates the need for ACK, REQ and PAQ, while only sending one replication message. For this particular configuration, the preferred embodiment uses TCP.

In WAN deployments with one primary and one or more backups and where the network connection between the primary and the backups are over a wide area network (WAN), TCP is the preferred implementation. The longer the distance between primary and backups, the more likely a UDP failure is. Over a WAN with many hops, UDP is more likely to require many retransmits, and is thus a less ideal choice than TCP. For WAN deployments with one primary and one backup, TCP is thus also the preferred transport WAN deployments with physically separate primary and backups are common in fault tolerant and disaster recovery systems, where the backup by design is placed geographically "far away" to reduce the possibility of simultaneous failure of primary and backup.

10.7 Comparison to Two Phase Commit

The problem of ensuring consistency between primary and backup appears similar to the distributed atomic transaction commitment encountered in database systems. One might thus think that some of the well-known solutions, such as two-phase commit (2PC) and three-phase commit (3PC) would work. This is however, not the case. The transaction model underlying 2PC and 3PC uses query to commit, commit and rollback as fundamental operations. None of those have equivalents in functional programming. By way of example, an intercepted function is called and the return values used. There is no notion of rolling back the function call, or pre-determine if the call should be taken. Functions are called based on the programmed logic, and no other conditions. Furthermore, 2PC is a blocking protocol, while the present invention lets the primary run unimpeded for maximum speed.

11. SYNCHRONOUS LIVE MIGRATION

The reliable messaging layer teachings in section 10 disclose a protocol that ensures ordered guaranteed delivery of messages even when the underlying transport doesn't provide those features. If the transport, primary or backup crash or becomes non-functional the reliable messaging protocol at some point cannot communicate. The following teachings add the ability to recover across faults, and have the backup resume execution if the primary crashes or otherwise becomes unavailable.

11.1 Planned Live Migration

When primary and backups are executing, a backup is able to take over execution from the primary with little additional failover management. The backup is already running the primary program; it's just a "bit behind" based on its processing of replication messages.

A special replication message with methodID of TAKEOVER designates that the backup should take over. ProcessID and ThreadID can be set to zero for the TAKEOVER message. The DATA field in a takeover message designates the host that is the new designated primary. An example TAKEOVER message is thus TAKEOVER, Sn, 0,0, {DATA, len,newPrimary}, where 'newPrimary' is either the IP address of the designated new primary of the fully qualified host name on the network.

FIG. 22 illustrates by way of example embodiment 920, a scenario where a backup server takes over from a primary. The primary server 922 is running the primary application which is generating replication messages 926 S0, S1, S2, and S3. The messages are first written to the log as disclosed in section 12 below but without the checkpoints, then sent via the reliable messaging layer (RML) to the backup 924. The backup 924 is initially acting as backup 932 and is processing incoming replication messages S0, S1, S2, and S3 as previously disclosed In order to migrate the running primary application, it must first be deterministically halted. In the general case of a multi-process application the primary application is executing concurrently with the RML sending replication messages and it is thus necessary to ensure there are no "in process" messages under creation. Specifically, the present invention ensures that the primary has not entered or has already exited any intercepted calls, which means that the primary has either 1) not shipped or 2) fully shipped the associated replication messages. The halting is achieved through the use of Barrier Synchronization (as previously defined).

FIG. 23 illustrates by way of example embodiment 960 the operation of the barrier 980. Adapted and simplified from FIG. 4 Thread 0 962 is executing along with Thread 1 964. Thread 0 calls create( ) on a resource 970 which is intercepted 972 by the Resource interceptor 966. Immediately upon entering the interceptor 966 the barrier 980 is encountered and tested. If no Barrier signal is set execution proceeds as previously disclosed including creating the resource 974 by calling the underlying resource 968, sending a corresponding replication message 976 through the message engine 978 and returning to the interceptor 976. Finally, before exiting the interceptor 977, the barrier 980 is tested again. The barrier thus ensures that if the barrier is activated that execution stops right inside the interceptor before the resource has been created and replication messages sent, or right before returning to the application where the resource has been created and the replication message sent. While the above example used create( ) it is apparent to someone with ordinary skills in the art that the above disclosures apply to any access to said resource. In other words, the barrier ensures that access to the resource and the corresponding replication message are synchronized to the entry and exit of the interceptor.

In order to migrate the execution from primary to a backup, the steps are thus

1. Activate the barrier for all resources and stop execution at the barrier

2. Generate and send TAKEOVER replication message

3. Exit( ) primary application while still halted in the barrier without letting the application run again.

The combined use of halting at the barrier, sending a TAKEOVER message and then exiting the primary application ensures that the replication messages from the primary correspond to fully finished resource calls.

FIG. 22 illustrates by way of example embodiment 920 the operation of TAKEOVER on the backup as well. So far the backup 932, acting as a backup, has processed replication messages S0, S1, S2 and S3. Since the primary was halted and the TAKEOVER 928 message sent after the last replication messages S3, the arrival of the TAKEOVER 938 messages initiates the takeover process. The backup 932 is promoted to "new primary" 934 and starts generating replication messages instead of processing them. Upon being promoted, the new primary 934 switches interceptors and starts using the interceptors for the primary and sends out replication messages. By way of example as the new primary runs, it generates the next replication message S4 942. As the original primary 922 called exit( ) 929 immediately after sending the TAKEOVER messages and without letting the application run again, the new primary 934 resumes execution at the point of execution corresponding to the barrier.

The Barrier was placed at the entry and exit of the interceptors. This ensures that the primary's internal state is consistent relative to possibly external resource state and that there are no partially executed operations on resources.

In the case of multiple backups, the TAKEOVER message is sent to a pre-configured backup, an operator-chosen backup, or a backup is dynamically chosen based on available resources.

The Live Migration was made possible by the combined use of the barrier and the fact that the migration was triggered externally. This allowed for activation of the barrier, the deterministic halting of primary execution and the creation of a TAKEOVER message. In the event of a fault, where the primary crashes at a non-deterministic point in time, it is not possible to activate the barrier and thus not directly possible to use the teachings above. In the following, the teachings are amended by the use of checkpointing to support live migration in response to faults and other asynchronous events.

12. ASYNCHRONOUS LIVE MIGRATION

The Havemose and Backensto references included above in their entirety teach the use of checkpointing to capture application state and to perform planned migration based on checkpoints. A checkpoint encapsulates the entire application state, including the applications connections to system libraries and the operating system at a point in time. Restoring an application to an existing checkpoint therefore generally corresponds to setting the application "back in time"; essentially losing the execution that had taken place after taking the checkpoint. If an application is migrated and then terminated (planned migration) before executing again on the primary the migration is loss-less as taught in above and in Havemose and Backensto.

Restoring an application to an existing checkpoint, i.e. an earlier point in time, generally has undesirable and unpredictable side effects. By way of example using an eCommerce application, if after a checkpoint was taken a user purchased an item, a fault occurred, and the eCommerce application was restored to said checkpoint, the purchased item may be purchased a second time, lost by the eCommerce application or rejected as a duplicate. It is thus not a viable strategy to simply restore an application to an existing checkpoint and repeat the application execution. If, in continuation of the example, the eCommerce application was planned migrated, the migration would be loss-less and the backup application would continue execution exactly where it was on the primary at the time of the checkpoint and migrate.

For a fault recovery strategy to work for live applications, it is thus necessary for the backup resume execution from exactly where the primary was at the time of the fault; it is not a viable strategy to simply restore from a checkpoint and re-run the application. As faults occur at unpredictable points in time (asynchronously), the primary has been executing since the most recent checkpoint.

Both the Havemose and Backensto references use a barrier to deterministically halt the application prior to taking a checkpoint. The teachings of Havemose and Backensto are amended to use the barrier disclosed in section 11 instead of the barrier provided in the respective disclosures. Using the barrier disclosed in section 11 as part of the checkpointer ensures consistency between the checkpoint, external resources and replication messages. In the following teachings, any reference to checkpointing thus means checkpointing as taught in Havemose and Backensto amended with the barrier disclosed in section 11.

12.1 Checkpointing with Message Logging

FIG. 17 illustrates by way of example embodiment 700 the full architecture with checkpointer, messaging engine and reliable messaging layer, a primary server 702 and its corresponding backup server 722 working as a pair of primary and backup. The primary application 704 is comprised of two processes; process A 706 and process B 708, each with two running threads. Process A's interception layer 710, the checkpointing library 712, Messaging Engine 717 and Reliable Messaging Layer 718 are interposed between process A 706 and the operating system and libraries 719. Likewise, Process B's interception layer 714, the checkpointing library 712, the Messaging Engine 717, and reliable messaging Layer 718 are interposed between process B 708 and the operating system and libraries 719. As previously disclosed, the checkpointer 712, messaging engine 717, and Reliable Messaging Layer 718 are shared between all processes in an application.

Using a similar architecture, the backup server 722 contains the backup application (the replica) 724 comprised of process A 726 and process B 728 each with two threads. The Interception Layers IL 730 for process A and IL 734 for process B are interposed together with the checkpointer 732, the Messaging Engine 737, and the Reliable Messaging Layer 738 between the two processes and the system libraries and operating system 739. Primary 702 and backup 722 communicate over a network 701.

As taught in Havemose and Backensto, checkpoints include the entire state of a running application, including the state of any shared libraries loaded into the address space of the application. Referring to FIG. 17 for illustrative purposes, the state of the messaging engine 717, Reliable Messaging Layer 718 and all interceptors 710,712,714, 716 are thus included in the checkpoint. As the messaging Engine sends messages via the reliable messaging layer, at the time of a checkpoint, all information, including all buffers and PAQ are included and current in the checkpoint.

To capture application activity since the last checkpoint, replication messages are logged on shared storage along with the checkpoints. FIG. 18 illustrates by way of example embodiment 740 the logging mechanisms for replication messages and checkpoints. The log 758 is comprised of one or more log sets. A log set is a collection of logged events, generally starting with a checkpoint, followed by zero or more logged replication messages.

On the primary, the messaging engine 742 sends messages to the reliable messaging layer 744 for distribution to all the backups. As previously disclosed each replication message has a unique sequence number, and as before replication message with sequence number Si is identified as "Si" in the disclosures and figures. Havemose and Backensto disclose a variety of ways in which checkpoints can be triggered. These include time-based triggers and event-based triggers. In the following disclosures we, by way of example, trigger checkpointing every 'n' replication messages, where 'n' is an integer 1 or larger. The disclosures are broadened to cover any checkpoint trigger in the following section.

FIG. 18 illustrates by way of example embodiment 740, the logging and management of checkpoints and replication messages. The log 758 is kept on networked storage accessible by both primary and backup. Checkpoints are triggered 743 based on sequence numbers within the Message Engine 742. Checkpoints are placed in special replication messages, assigned a sequence number and stored in the log along with the individual replication messages.

As the primary application executes, the messaging engine 742 sends replication messages through the reliable messaging layer. Prior to sending the replication messages to the backups using the disclosures above, the replication messages are stored in a log 758 on shared storage. First message S0 746 is generated and stored 766 in Log Set 0 760. The second replication message S1 748 is generated and appended 768 to Log Set 0 760. The third message is a checkpoint 750 with sequence number 2. As the checkpoint contains the entire state of the application, a new log set 762, called Log Set 1, is started and CKPT2 becomes its first element 770. The checkpoint CKPT2 is the most recent full state image and serves as the basis for recovery until another checkpoint has been successfully taken. This is followed by message S3 752 being appended 772 to log set 1 762, and finally S_(t−1) 754 being appended 774 to log set 1 762. At this point another checkpoint has been taken CKPT_t 756 and a new log set 764, designated Log Set 2, is started with CKPT_t 776 as its first element. Checkpoint replication messages are only saved in the log, they are not sent over the reliable messaging protocol to the backups.

12.2 Management of Logs

Recovery of an application requires access to the most recent checkpoint and all replication messages since the checkpoint. There is thus no need to keep older log sets as soon as a new checkpoint has been written. By way of example and referring to the example embodiment 740 on FIG. 18: as soon as checkpoint-2 770 has been written and log set 1 762 therefore started, log set 0 760 can be deleted. Likewise, as soon as CKPT_t 776 has been written and Log Set 2 764 started, Log Set 1 762 can be deleted. At any point in time only the most recent log set needs to stored, all older log sets are deleted. The trigger for deletion of an older log set is the completion of writing a checkpoint to create a new log set. In an alternate embodiment the two most recent log sets are kept to facilitate error recovery to a point further back in time.

12.3 PAQ Logging

In the event that the primary crashes or otherwise becomes unavailable, the Pending ACK Queue (PAQ) on the primary likewise may become unavailable. To recover across faults of the primary, an additional layer of logging is thus necessary. At any point in time the PAQ contains messages sent to backups that have yet to be ACK'ed by the backups.

FIG. 21 illustrates by way of example embodiment 900 the PAQ Log 918 and its integration into the overall architecture. Section 10 disclosed the PAQ and its use within the context of the present invention. In addition to the PAQ on the primary, the PAQ log 918 is stored on shared storage 916 accessible by primary and all backups.

Prior to sending message S0 910 a copy is first stored in the PAQ Log 918 and then in the PAQ 902 on the primary. Receiving an ACK 912, the corresponding messages S0(B0) is first removed from the PAQ Log 918, then from the PAQ 904 on the primary. Receiving a REQ 914 S0(B1) bypasses the PAQ log 918 and retrieves the message S0(B1) 908 straight from the PAQ. The REQ messages leaves the PAQ and the PAQ Log unchanged. The message operations on the PAQ LOG 918 are identical to the operations performed on the PAQ on the primary, and the PAQ log is thus contains the same messages as in the PAQ on the primary. In an alternate embodiment, the disk based PAQ Log 918 is the only PAQ; the PAQ Log 918 is used in place of a PAQ local to the primary.

12.4 Taking Checkpoints

As taught in Backensto and Havemose, checkpointing involves the following steps: a checkpointing trigger event, deterministically halting the application at the barrier, capturing and saving the checkpoint, followed by letting the application resume execution. The deterministic halting ensures that the checkpoint, which is assembled over a brief period of time, is consistent across the entire application and its shared libraries. As disclosed above, the barrier mentioned above is the barrier disclosed in section 11.

Checkpoints can be triggered asynchronously in a number of ways. The trigger can be built into the checkpointer library itself or provided externally. In the preferred embodiment checkpoints are triggered using a certain number replication messages. Referring to the example embodiment 740 on FIG. 18 for illustrative purposes: the checkpoint trigger 743 uses sequence numbers from the message engine 742 to trigger checkpointing. By way of example, checkpoints are taken every 5 replication messages. In other preferred embodiments checkpoints are triggered by one or more resource events. Example resource events are: a timer, a CPU threshold being exceeded, a memory threshold being exceeded, or a storage threshold being exceeded. Other events include, but are not limited to the operator manually triggering a checkpoint, or other external event such as an SNMP event or a script-generated event.

12.5 Restoring from Checkpoints

Backensto and Havemose teach restoration of multi process applications from checkpoints. After an application has been restored from a checkpoint every aspect of the application, such as memory image, storage image, state of shared libraries, open files, open ports, connections to the underlying operating system and shared libraries etc. have been reset to the state they were in at the time of the checkpoint. The restored application is ready to resume execution right where the application was at the time the checkpoint was taken.

12.6 Processing CKPT Replication Messages on the Backup

CKPT replication messages are ignored on the backups when running normally. CKPT messages are only used as part of fault recovery as described in the following sections.

12.7 Migration after Faults

Faults and other unplanned interruptions are asynchronous, i.e. they can happen at any point in time. By way of example, the application may be in the middle of a computation when the fault occurs; and the backup must resume execution in a way that produces the same external results, i.e. the backup must produce the results that primary would have produces had it continued execution.

FIG. 20 illustrates by way of example embodiment 840 a live migration in response to an application crash. The primary 842 is running producing a series of replication messages. The replication messages start with S0 850 followed by S1 and then a checkpoint CKPT 851. S0 and S1 are written to Log Set 0 872 in the log 870. The checkpoint CKPT 851 triggers the creation of a new Log Set (Log Set 1) 874 within the log 870. The primary continues execution after the CKPT 851 and generates replication messages S3, S4 and S5 852. Said replication messages are written to Log Set 1 874 as S3

882, S3 884 and S5 886. Before any more replication messages can be created the application crashes 854.

Meanwhile the backup 844 is operating as a backup system 846 and is processing incoming replication messages 856 S0, S1, CKPT, S3 and S4 860. The backup never gets to process replication message S5 852 from the primary prior to the crash.

Fault detection is taught in Ngan [U.S. application Ser. No. 11/213,678] which is included in its entirety by reference. Upon detecting the crash (i.e. a fault) 854 of the primary, the fault recovery is initiated which ultimately result in a backup 846 being promoted to "new primary" 848.

First the most recent checkpoint in the log 870 is identified. In this case, the most recent checkpoint is CKPT 880 in Log Set 1 874. Secondly, the last replication message in the log is identified. In this case, the most recent replication messages is S5 886 in Log Set 1 874.

If the backup "is caught up", i.e. the last processed incoming replication message is the same as the last logged replication message, the backup can be promoted to primary as disclosed in the previous section. Since the primary is down, a TAKEOVER replication message is not created by the primary, but rather provided by the fault detector. The backup receives a TAKEOVER message from the fault detector and proceeds to take over execution and promotes itself to primary as disclosed in the previous section.

If the backup is not caught up, a full recovery using checkpoints is required. FIG. 20 illustrates by way of example embodiment 840 this scenario:

First the most recent checkpoint CKPT 880 is identified in the log 870 and the application is restored from said checkpoint 862. The log further contains replication messages S3 882, S4 884 and S5 886 which were processed by the primary, and which now needs to be processed again as the application was reset to a checkpoint pre-dating the messages S3, S4 and S5.

As taught in section 9 above, replication messages reading or receiving data contain said data within the DATA block and are thus self-contained and can be repeated. First message S3 is repeated, i.e. sent to the new primary 864. When acting as a backup, the last processed replication message was S4, and S3 is thus run as if it were being processed on the backup. This means that S3 is processed without actually using the resource and instead using the results provided within the replication message itself. S4 is processed in the same way.

Replication message S5 886 was produced by the primary but never received by the backup. The message is sent to the new primary and processed just like S3 and S4. As S5 was processed on the primary the underlying resource reflect S5, and processing of S5 likewise runs by skipping actual resource access and using the results provided in the replication message itself.

At this point the new primary has caught up and the final recovery step is to restore the PAQ log 888 in order to reflect the final state of pending communication prior to the fault. Entries corresponding to the new primary 848 are removed, and other entries left unchanged. At this point, the new primary is fully promoted and executes as a primary; any new replication messages S6 889 are processed as new messages on a primary server.

13. COLD FAILOVER AND MIGRATION

The teachings so far have covered scenarios with a primary and one or more running backups. The teachings are now expanded to cover the scenario where only the primary is running and the backups are brought up, or booted, in response to a fault recovery or a live migration request.

13.1 Planned Live Migration Using Checkpoints

The teachings above in section 11 and section 12 are easily combined to cover planned migration using checkpoints. While a planned migration can be performed without checkpoints if both primary and backup are running as disclosed in section 11, checkpoints enable live migration in the scenario where the backup is not yet in service.

FIG. 19 illustrates by way of example embodiment 800, a scenario with a primary 802 running and the backup 804 off or idle. The backup is not running the application and is not processing replication messages. The primary 802 is running and generating replication messages 806 S0, S1, a checkpoint CKPT and S3. The checkpoints and replication messages are written the previously introduced log 820 along with the state of the PAQ 818.

A request to live migrate 808 triggers the live migration process. First a final checkpoint is taken 808 and this final checkpoint written to the log 820 along with the final PAQ 818. The application, still within the barrier, then exits 810.

The backup is at this point not running. The TAKEOVER messages 808 triggers the following sequence of events 1. Backup server is booted 812 if not already in service
2. The backup is restored 814 from the most recent checkpoint in the replication message log 820.
3. The PAQ is restored from the PAQ Log 818
4. The backup is released from the barrier and continues to process messages as the new primary The combined use of checkpointing updated with the new barrier enables application migration even in the case where the backup is not yet running the application. As the backup is not running at the time of the request to migrate, the migration takes longer than if the backup were already running. The benefit, however, is that live migration is supported even without a dedicated pre-configured backup server.

13.2 Cold Fault Recovery Using Checkpoints.

The teachings in section 12 and section 13.1 are easily combined to teach fault recovery for scenarios where the backup is not running at the time of the fault.

Section 13.1 teaches booting of the backup server and restoration from checkpoints in the case of a planned migration. As taught in section 12, the fault detector can likewise trigger recovery on the backup in the event of a fault. The teachings above thus combine to also support fault recovery for the cases where no dedicated backup application is running and prepared to take over.

14. DEPLOYMENT SCENARIOS

Figure 10:
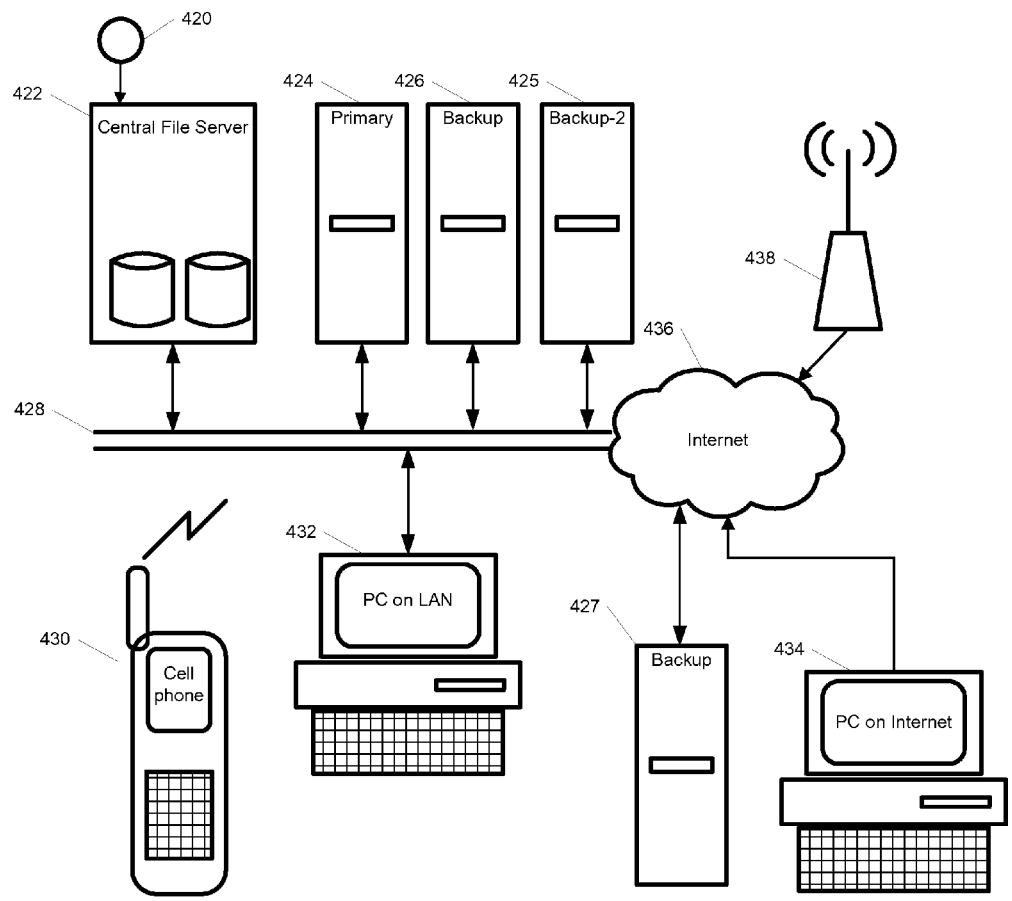

FIG. 10 further illustrates by way of example embodiment 420 a variety of ways the invention can be configured to operate.

In one embodiment, the invention is configured with a central file server 422, primary server 424 and backup server 426. The primary server 424 runs the primary application and the backup server runs the backup application. The primary 424 and backup 426 are connected to each other and the storage device 422 via a network 428. The network is connected to the internet 436 for external access. In another embodiment the primary server 424 is replicated onto two backup servers; backup 426 and backup-2 425. In yet another embodiment the primary 424 runs in the data center, while the backup 427 runs off site, accessed over the internet In one embodiment a PC client 432 on the local network 428 is connected to the primary application while the backup application is prepared to take over in the event of a fault. In another embodiment a PC 434 is configured to access the primary application server 424 over the public internet 436. In a third embodiment a cell phone or PDA 430 is accessing the primary application 424 over wireless internet 438,436. The present invention is configured to server all clients simultaneously independently of how they connect into the application server; and in all cases the backup server is continuously replicating prepared to take over in the event of a fault Finally, as the interceptors and messaging engine are components implemented outside the application, the operating system and system libraries, the present invention provides replication consistency without requiring any modifications to the application, operating system and system libraries.

The just illustrated example embodiments should not be construed as limiting the scope of the invention but as merely providing illustrations of some of the exemplary embodiments of this invention

15. CONCLUSION

In the embodiments described herein, an example programming environment, systems and configurations were disclosed for which one or more embodiments according to the invention were taught. It should be appreciated that the present invention can be implemented by one of ordinary skill in the art using different program organizations and structures, different data structures, different configurations, different systems, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for providing live migration of a primary application to one or more backup applications, the system comprising:
   one or more memory locations configured to store said primary application executing on a host with a host operating system;
   one or more interceptors configured to intercept calls from threads of applications to the host operating system and shared libraries for access to resources, and configured to generate replication messages based on said intercepted calls;
   a barrier for said primary application that ensures that the replication messages from the primary application correspond to fully finished resource calls, by halting execution, and access to the resources and the corresponding replication messages are synchronized to the entry and exit of the interceptor;
   a messaging layer for said primary application configured to transmit said replication messages to the one or more backups;
   a logging facility for said messaging layer;
   a checkpointing service for said primary application configured to checkpoint said primary application; and
   one or more additional memory locations configured to store the one or more backup applications executing on one or more backup hosts each with a corresponding host operating system;
   one or more interceptors configured to intercept calls to said one or more backup host operating systems and shared libraries;
   one or more barriers for said one or more backup applications;
   a messaging layer for each one or more backup applications configured to provide ordered receipt of said replication messages;
   a checkpointing service for each one or more backup applications configured to checkpoint-restore said one or more backup applications; and
   wherein live migration of said primary application to said one or more backup hosts is performed in response to an event or fault.

2. The system according to claim 1, wherein said operating system is one of Linux, UNIX or Windows.

3. The system according to claim 1, wherein the messaging layers are configured to transmit said messages over one of UDP, TCP, UDP using multicast, or UDP using broadcast.

4. The system according to claim 1, wherein said event is one of operator generated live migration event, CPU threshold event, memory threshold event, storage threshold event, SNMP event, or script generated event.

5. The system according to claim 1, wherein said fault is one of application crash, host crash, operating system fault, memory fault, storage fault, power supply fault, or general device fault.

6. The system according to claim 1, wherein said barrier is configured to halt execution inside said interceptors.

7. The system according to claim 1, wherein said barrier is configured to halt execution outside said intercepted resource.

8. The system according to claim 1, wherein the system is configured to choose a backup host based on one of preconfigured backup, operator-chosen backup, or dynamically chosen backup based on available resources.

9. The system according to claim 1, wherein said event is generated external to the primary application.

10. The system according to claim 1, wherein the logging facility is configured to write each message to a log set in the log on shared storage, configured to write each checkpoint to a log set in the log on shared storage, configured to create a new log set with each new checkpoint, and configure to remove old log sets when a new log set has been created.

11. The system according to claim 10, wherein the logging facility is configured to include a pending acknowledgement queue.

12. The system according to claim 10, wherein said checkpointing service for the primary application is configured to be triggered by one of a certain amount of elapsed time since the last checkpoint, a certain number of replication messages, an operator event, a resource event, or another external event.

13. The system according to claim 10, wherein a log set is comprised of a checkpoint and all replication messages between said checkpoint and the next checkpoint.

14. The system according to claim 10, wherein said logging services are configured to store the two most recent log sets on shared storage.

15. The system according to claim 1, wherein the checkpointing services for the primary application is configured to be triggered by one of a certain amount of elapsed time since the last checkpoint, a certain number of replication messages, an operator event, a resource event, or another external event.

16. The system according to claim 1, wherein the checkpointing service for the primary application is configured to place said checkpoints in replication messages and to assign said checkpoints message IDs.

17. The system according to claim 16, wherein the logging facility is configured to log said checkpoint replication messages.

18. The system according to claim 16, wherein the logging facility is configured to store checkpoint replication messages and to not transmit said checkpoint replication messages to the one or more backups.

19. The system according to claim 16, wherein the logging facility is configured to store checkpoint replication messages and to transmit said checkpoint replication messages to the one or more backups over the messaging layer.

* * * * *